United States Patent
Han et al.

(10) Patent No.: US 11,611,912 B2
(45) Date of Patent: Mar. 21, 2023

(54) CELL RESELECTION METHOD AND RELATED DEVICE

(71) Applicant: HUAWEI TECHNOLOGIES CO., LTD., Shenzhen (CN)

(72) Inventors: Feng Han, Shanghai (CN); Hao Bi, Rolling Meadows, IL (US); Yinghao Jin, Shanghai (CN); Chong Lou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/715,291

(22) Filed: Dec. 16, 2019

(65) Prior Publication Data

US 2020/0120547 A1    Apr. 16, 2020

Related U.S. Application Data

(63) Continuation of application No. PCT/CN2018/090518, filed on Jun. 8, 2018.

(30) Foreign Application Priority Data

Jun. 16, 2017    (CN) .......................... 201710459592.7

(51) Int. Cl.
*H04W 36/00* (2009.01)
*H04W 76/30* (2018.01)
(Continued)

(52) U.S. Cl.
CPC .......... *H04W 36/0011* (2013.01); *H04W 4/06* (2013.01); *H04W 36/0079* (2018.08);
(Continued)

(58) Field of Classification Search
CPC . H04W 36/0011; H04W 76/30; H04W 76/27; H04W 36/0079; H04W 36/04; H04W 36/30; H04W 4/06
See application file for complete search history.

(56) References Cited

U.S. PATENT DOCUMENTS

2012/0089698 A1    4/2012   Tseng
2015/0154257 A1    6/2015   Xiong et al.
(Continued)

FOREIGN PATENT DOCUMENTS

CN    106851589    *   6/2017
CN    106851589 A      6/2017
(Continued)

OTHER PUBLICATIONS

Zte et al., "Service sensitive cell selection and reselection in NR", 3GPP draft; R2-1701388, Feb. 12, 2017, 6 pages. (Year: 2017).*
(Continued)

*Primary Examiner* — Ankur Jain
*Assistant Examiner* — Angelica Perez
(74) *Attorney, Agent, or Firm* — Hauptman Ham, LLP

(57) ABSTRACT

A cell reselection method includes generating, by a radio access network device, cell reselection information, wherein the cell reselection information includes an identifier of at least one carrier frequency and an identifier of a network slice supported by each of the at least one carrier frequency. The cell reselection method further includes sending, by the radio access network device, the cell reselection information to a terminal device, wherein the cell reselection information is useable by the terminal device for cell reselection.

17 Claims, 7 Drawing Sheets

(51) Int. Cl.
  *H04W 76/27* (2018.01)
  *H04W 4/06* (2009.01)
  *H04W 36/04* (2009.01)
  *H04W 36/30* (2009.01)

(52) U.S. Cl.
  CPC .......... *H04W 36/04* (2013.01); *H04W 36/30* (2013.01); *H04W 76/27* (2018.02); *H04W 76/30* (2018.02)

(56) References Cited

U.S. PATENT DOCUMENTS

| | | | |
|---|---|---|---|
| 2017/0070892 A1 | 3/2017 | Song et al. | |
| 2020/0382189 A1* | 12/2020 | Chen | H04W 72/046 |
| 2022/0030513 A1* | 1/2022 | Velev | H04W 8/183 |

FOREIGN PATENT DOCUMENTS

| | | | |
|---|---|---|---|
| CN | 106879009 A | | 6/2017 |
| CN | 107223350 A | * | 9/2017 |
| WO | WO 2017140342 A1 | * | 8/2017 |

OTHER PUBLICATIONS

Zte et al: "Service sensitive cell selection and reselection in NR",3GPP Draft; R2-1701388,Feb. 12, 2017,total 6 pages.
3GPP TR 23.799 V14.0.0:"3rd Generation Partnership Project; Technical Specification Group Services and System Aspects;Study on Architecture for Next Generation System(Release 14)",Dec. 2016,total 522 pages.
Zte: "Consideration on the NW slice in RAN",3GPP Draft; R2-1704679,May 5, 2017,total 4 pages.
3GPP TSG-RAN WG2#97bis,R2-1702591:"Slice Availability for Cell (Re-)Selection",Huawei, HiSilicon,Spokane, USA, Apr. 3, 7, 2017, total 3 pages.
Office Action dated Mar. 4, 2020 from corresponding application No. CN 201710459592.7.
The extended European search report dated Jan. 30, 2020 from corresponding application No. EP 18818108.5.
International search report dated Aug. 1, 2018 from corresponding application No. PCT/CN2018/090518.
Chinese Office Action issued in corresponding Chinese Application No. 202111070019.X, dated Mar. 31, 2022, pp. 1-14.

* cited by examiner

CELL RESELECTION METHOD AND RELATED DEVICE

CROSS-REFERENCE TO RELATED APPLICATIONS

This application is a continuation of International Application No. PCT/CN2018/090518, filed on Jun. 8, 2018, which claims priority to Chinese Patent Application No. 201710459592.7, filed on Jun. 16, 2017. The disclosures of the aforementioned applications are hereby incorporated by reference in their entireties.

TECHNICAL FIELD

Embodiments of the present invention relate to the field of communications technologies, and in particular, to a cell reselection method and a related device.

BACKGROUND

As a key technology of a fifth-generation (5G) wireless communications network, network slices (slice) attract wide attention and are researched in the Third Generation Partnership Project (3GPP) and various other international standardization organizations. Network slices can meet customized requirements of operators on various industries, vertical markets, and various virtual operation services. A network slice includes all resources (for example, computing, storage, and network resources) that can meet a service requirement. A terminal device can simultaneously support and access a plurality of network slices.

As shown in FIG. 1, a terminal device supports a network slice X and is attached to a cell (cell) 2 of a carrier frequency F2. When signal quality in the cell 2 becomes poor, the terminal device performs cell reselection. However, if only cell signal quality is considered, the terminal device selects a cell 30 of a carrier frequency F3, but the cell 30 does not support the network slice X. Therefore, when the terminal device initiates a connection request in the cell 30, the connection request of the terminal device is rejected by the cell 30. As a result, cell reselection of the terminal device becomes ineffective. Therefore, how to reduce ineffective cell reselection of a terminal device in an idle (idle) state or an inactive (inactive) state in a cell reselection process is a technical problem that needs to be resolved currently.

SUMMARY

Embodiments of the present invention provide a cell reselection method and a related device, so that when a terminal device performs cell reselection, cases in which the terminal device reselects a cell that does not support a network slice supported by the terminal device can be reduced, and signaling overheads generated because the terminal device performs ineffective cell reselection can be reduced.

The embodiments of the present invention may be specifically implemented by using the following technical solutions:

According to a first aspect, an embodiment of the present invention provides a cell reselection method, applied to a radio access network device side. The method includes: generating, by a radio access network device, cell reselection information, where the cell reselection information includes an identifier of at least one carrier frequency and an identifier of a network slice supported by each of the at least one carrier frequency; and sending, by the radio access network device, the cell reselection information to a terminal device, where the cell reselection information is used by the terminal device to perform cell reselection. In this embodiment of the present invention, the identifier of the network slice supported by each carrier frequency is newly added to the cell reselection information sent by the radio access network device to the terminal device. Therefore, during cell reselection, the terminal device may perform cell reselection based on a network slice supported by the terminal device and the network slice supported by each carrier frequency. In this way, cases in which the terminal device reselects a cell that does not support a network slice supported by the terminal device can be reduced, and signaling overheads generated because the terminal device performs ineffective cell reselection can be reduced.

In a possible design, the radio access network device may send the cell reselection information to the terminal device in the following manner: broadcasting the cell reselection information to the terminal device.

In a possible design, the radio access network device may send the cell reselection information to the terminal device in the following manner: adding the cell reselection information to a radio resource control (RRC) message, and sending the cell reselection information to the terminal device.

In a possible design, the cell reselection information further includes priority information corresponding to each carrier frequency.

In a possible design, the cell reselection information further includes priority information corresponding to each of network slices supported by the terminal device.

In a possible design, if the radio access network device adds the cell reselection information to the RRC message and sends the cell reselection information to the terminal device, the network slice supported by each carrier frequency includes some or all of network slices supported by the terminal device.

In a possible design, the RRC message includes an RRC connection release message or an RRC connection reject message.

In a possible design, if the radio access network device adds the cell reselection information to the RRC connection release message or the RRC connection reject message and sends the cell reselection information to the terminal device, the cell reselection information further includes an identifier of a first network slice that causes an RRC connection of the terminal device to be released or rejected.

In a possible design, the identifier of the network slice is session management slice selection assistance information (SNSSAI) corresponding to the network slice, slice service type (SST) information corresponding to the network slice, or a network slice set identifier corresponding to the network slice, where one piece of SNSSAI corresponds to one network slice, one SST corresponds to one or more network slices, and one network slice set identifier corresponds to one or more network slices.

In a possible design, before generating the cell reselection information, the radio access network device receives a first request sent by the terminal device, where the first request is used to request the radio access network device to send the cell reselection information. The generating, by the radio access network device, the cell reselection information is specifically: generating, by the radio access network device, the cell reselection information based on the first request. The sending, by the radio access network device, the cell reselection information to the terminal device is specifically:

adding, by the radio access network device, the cell reselection information to a random access response message (for example, a msg2 or a msg4 in a Long Term Evolution (LTE) or 5G system), and broadcasting the cell reselection information to the terminal device; or broadcasting, by the radio access network device, the cell reselection information to the terminal device through a broadcast channel. The radio access network device broadcasts the cell reselection information only after receiving the request sent by the terminal device, instead of always broadcasting the cell reselection information. Compared with a manner in which the radio access network device always broadcasts the cell reselection information, this can reduce broadcast signaling overheads.

According to a second aspect, an embodiment of the present invention provides a cell reselection method, applied to a terminal device side. The method includes: receiving, by a terminal device, cell reselection information sent by a radio access network device, where the cell reselection information includes an identifier of at least one carrier frequency and an identifier of a network slice supported by each of the at least one carrier frequency; and when the terminal device performs cell reselection, selecting, by the terminal device based on the identifier of the network slice supported by each carrier frequency, a cell on a carrier frequency that supports a network slice supported by the terminal device as a reselected to-be-camped cell. In this embodiment of the present invention, the identifier of the network slice supported by each carrier frequency is newly added to the cell reselection information sent by the radio access network device to the terminal device. Therefore, during cell reselection, the terminal device may reselect, based on the network slice supported by the terminal device and the network slice supported by each carrier frequency, the cell on the carrier frequency that supports the network slice supported by the terminal device as the reselected to-be-camped cell. In this way, cases in which the terminal device reselects a carrier frequency that does not support the network slice supported by the terminal device can be reduced, and signaling overheads generated because the terminal device performs ineffective cell reselection can be reduced.

In a possible design, the terminal device may receive, in the following manner, the cell reselection information sent by the radio access network device: receiving the cell reselection information broadcasted by the radio access network device.

In a possible design, the terminal device may receive, in the following manner, the cell reselection information sent by the radio access network device: receiving the cell reselection information sent by the radio access network device by using an RRC message.

In a possible design, the cell reselection information further includes priority information corresponding to each carrier frequency. The selecting, by the terminal device based on the identifier of the network slice supported by each carrier frequency, a cell on a carrier frequency that supports a network slice supported by the terminal device as a reselected to-be-camped cell is specifically: selecting, based on the identifier of the network slice supported by each carrier frequency and the priority information corresponding to each carrier frequency, a cell on a carrier frequency that supports the network slice supported by the terminal device and that has a highest priority as the reselected to-be-camped cell. In this embodiment of the present invention, the terminal device can reselect a cell that supports the network slice supported by the terminal device and that has the highest priority.

In a possible design, the cell reselection information further includes priority information corresponding to each of network slices supported by the terminal device. The selecting, by the terminal device based on the identifier of the network slice supported by each carrier frequency, a cell on a carrier frequency that supports a network slice supported by the terminal device as a reselected to-be-camped cell is specifically: selecting, based on the identifier of the network slice supported by each carrier frequency and the priority information corresponding to each network slice, a cell on a carrier frequency that supports a highest-priority network slice of the network slices supported by the terminal device as the reselected to-be-camped cell. In this embodiment of the present invention, the terminal device can reselect a cell on a carrier frequency that supports a highest-priority network slice of the network slices supported by the terminal device.

In a possible design, if the terminal device receives the cell reselection information sent by the radio access network device by using the RRC message, the network slice supported by each carrier frequency includes some or all of network slices supported by the terminal device. In this embodiment of the present invention, each carrier frequency carried in the cell reselection information sent by the radio access network device supports the network slice supported by the terminal device. Therefore, cases in which the terminal device reselects a cell that does not support the network slice supported by the terminal device can be reduced.

In a possible design, the RRC message includes an RRC connection release message or an RRC connection reject message.

In a possible design, if the terminal device receives the cell reselection information sent by the radio access network device by using the RRC connection release message or the RRC connection reject message, the cell reselection information further includes an identifier of a first network slice that causes an RRC connection of the terminal device to be released or rejected. The selecting, by the terminal device based on the identifier of the network slice supported by each carrier frequency, a cell on a carrier frequency that supports a network slice supported by the terminal device as a reselected to-be-camped cell includes: selecting, by the terminal device based on the identifier of the network slice supported by each carrier frequency and the identifier of the first network slice, a cell on a carrier frequency that supports another network slice other than the first network slice as the reselected to-be-camped cell. In this embodiment of the present invention, the terminal device may select, based on the first network slice, a cell that supports a network slice that does not cause an RRC connection to be released or rejected.

In a possible design, the identifier of the network slice is SNSSAI corresponding to the network slice, slice service type SST information corresponding to the network slice, or a network slice set identifier corresponding to the network slice, where one piece of SNSSAI corresponds to one network slice, one SST corresponds to one or more network slices, and one network slice set identifier corresponds to one or more network slices.

In a possible design, before receiving the cell reselection information sent by the radio access network device, the terminal device sends a first request to the radio access network device, where the first request is used to request the radio access network device to send the cell reselection information. The receiving, by a terminal device, cell reselection information sent by a radio access network device is specifically: receiving, by the terminal device, the cell reselection information broadcasted by the radio access network device by using a random access response message (for example, a msg2 or a msg4 in an LTE or 5G system); or receiving, by the terminal device, the cell reselection information broadcasted by the radio access network device through a broadcast channel. The radio access network device broadcasts the cell reselection information only after receiving the request sent by the terminal device, instead of always broadcasting the cell reselection information. Compared with a manner in which the radio access network device always broadcasts the cell reselection information, this can reduce broadcast signaling overheads.

According to a third aspect, an embodiment of the present invention further provides a radio access network device. The radio access network device implements functions of the radio access network device in the cell reselection method in the first aspect, and therefore can also implement beneficial effects of the cell reselection method in the first aspect. The functions of the radio access network device may be implemented by hardware, or may be implemented by hardware executing corresponding software. The hardware or the software includes at least one module or unit corresponding to the foregoing functions.

In a possible design, the radio access network device includes a processing unit and a communications unit. The processing unit is configured to generate cell reselection information, where the cell reselection information includes an identifier of at least one carrier frequency and an identifier of a network slice supported by each of the at least one carrier frequency. The communications unit is configured to send the cell reselection information to a terminal device, where the cell reselection information is used by the terminal device to perform cell reselection.

In this embodiment of the present invention, the identifier of the network slice supported by each carrier frequency is newly added to the cell reselection information sent by the radio access network device to the terminal device. Therefore, during cell reselection, the terminal device may perform cell reselection based on a network slice supported by the terminal device and the network slice supported by each carrier frequency. In this way, cases in which the terminal device reselects a cell that does not support a network slice supported by the terminal device can be reduced, and signaling overheads generated because the terminal device performs ineffective cell reselection can be reduced.

In a possible design, the communications unit being configured to send the cell reselection information to a terminal device includes: broadcasting the cell reselection information to the terminal device.

In a possible design, the communications unit being configured to send the cell reselection information to a terminal device includes: adding the cell reselection information to an RRC message, and sending the cell reselection information to the terminal device.

In a possible design, the cell reselection information further includes priority information corresponding to each carrier frequency.

In a possible design, the cell reselection information further includes priority information corresponding to each of network slices supported by the terminal device.

In a possible design, if the communications unit adds the cell reselection information to the RRC message and sends the cell reselection information to the terminal device, the network slice supported by each carrier frequency includes some or all of network slices supported by the terminal device.

In a possible design, the RRC message includes an RRC connection release message or an RRC connection reject message.

In a possible design, if the communications unit adds the cell reselection information to the RRC connection release message or the RRC connection reject message and sends the cell reselection information to the terminal device, the cell reselection information further includes an identifier of a first network slice that causes an RRC connection of the terminal device to be released or rejected.

In a possible design, the identifier of the network slice is SNSSAI corresponding to the network slice, an SST corresponding to the network slice, or a network slice set identifier corresponding to the network slice, where one piece of SNSSAI corresponds to one network slice, one SST corresponds to one or more network slices, and one network slice set identifier corresponds to one or more network slices.

In a possible design, before the processing unit generates the cell reselection information, the communications unit is further configured to receive a first request sent by the terminal device, where the first request is used to request the radio access network device to send the cell reselection information. The generating, by the processing unit, the cell reselection information is specifically: generating the cell reselection information based on the first request. The communications unit being configured to send the cell reselection information to a terminal device is specifically: adding the cell reselection information to a random access response message (for example, a msg2 or a msg4 in an LTE or 5G system), and broadcasting the cell reselection information to the terminal device; or broadcasting the cell reselection information to the terminal device by using a broadcast channel. The radio access network device broadcasts the cell reselection information only after receiving the request sent by the terminal device, instead of always broadcasting the cell reselection information. Compared with a manner in which the radio access network device always broadcasts the cell reselection information, this can reduce broadcast signaling overheads.

According to a fourth aspect, an embodiment of the present invention further provides a terminal device. The terminal device implements functions of the terminal device in the cell reselection method in the second aspect, and therefore can also implement beneficial effects of the cell reselection method in the second aspect. The functions of the terminal device may be implemented by hardware, or may be implemented by hardware executing corresponding software. The hardware or the software includes at least one module corresponding to the foregoing functions.

In a possible design, the terminal device includes a processing unit and a communications unit. The communications unit is configured to receive cell reselection information sent by a radio access network device, where the cell reselection information includes an identifier of at least one carrier frequency and an identifier of a network slice supported by each of the at least one carrier frequency. The processing unit is configured to: when the terminal device performs cell reselection, select, based on the identifier of the network slice supported by each carrier frequency, a cell on a carrier frequency that supports a network slice supported by the terminal device as a reselected to-be-camped cell.

In this embodiment of the present invention, the identifier of the network slice supported by each carrier frequency is newly added to the cell reselection information sent by the radio access network device to the terminal device. Therefore, during cell reselection, the terminal device may perform cell reselection based on a network slice supported by the terminal device and the network slice supported by each carrier frequency. In this way, cases in which the terminal device reselects a cell that does not support a network slice supported by the terminal device can be reduced, and signaling overheads generated because the terminal device performs ineffective cell reselection can be reduced.

In a possible design, the communications unit being configured to receive cell reselection information sent by a radio access network device includes: receiving the cell reselection information broadcasted by the radio access network device.

In a possible design, the communications unit being configured to receive cell reselection information sent by a radio access network device includes: receiving the cell reselection information sent by the radio access network device by using an RRC message.

In a possible design, the cell reselection information further includes priority information corresponding to each carrier frequency. The processing unit being configured to select, based on the identifier of the network slice supported by each carrier frequency, a cell on a carrier frequency that supports a network slice supported by the terminal device as a reselected to-be-camped cell includes: selecting, based on the identifier of the network slice supported by each carrier frequency and the priority information corresponding to each carrier frequency, a cell on a carrier frequency that supports the network slice supported by the terminal device and that has a highest priority as the reselected to-be-camped cell. In this embodiment of the present invention, the terminal device can reselect a cell that supports the network slice supported by the terminal device and that has the highest priority.

In a possible design, the cell reselection information further includes priority information corresponding to each of network slices supported by the terminal device. The processing unit being configured to select, based on the identifier of the network slice supported by each carrier frequency, a cell on a carrier frequency that supports a network slice supported by the terminal device as a reselected to-be-camped cell includes: selecting, based on the identifier of the network slice supported by each carrier frequency and the priority information corresponding to each network slice, a cell on a carrier frequency that supports a highest-priority network slice of the network slices supported by the terminal device as the reselected to-be-camped cell. In this embodiment of the present invention, the terminal device can reselect a cell on a carrier frequency that supports a highest-priority network slice of the network slices supported by the terminal device.

In a possible design, if the communications unit receives the cell reselection information sent by the radio access network device by using an RRC message, the network slice supported by each carrier frequency includes some or all of network slices supported by the terminal device. In this embodiment of the present invention, each carrier frequency carried in the cell reselection information sent by the radio access network device supports the network slice supported by the terminal device. Therefore, cases in which the terminal device reselects a cell that does not support the network slice supported by the terminal device can be reduced.

In a possible design, the RRC message includes an RRC connection release message or an RRC connection reject message.

In a possible design, if the communications unit receives the cell reselection information sent by the radio access network device by using the RRC connection release message or the RRC connection reject message, the cell reselection information further includes an identifier of a first network slice that causes an RRC connection of the terminal device to be released or rejected. In this embodiment of the present invention, the terminal device may select, based on the first network slice, a cell that supports a network slice that does not cause an RRC connection to be released or rejected.

In a possible design, the identifier of the network slice is SNSSAI corresponding to the network slice, an SST corresponding to the network slice, or a network slice set identifier corresponding to the network slice, where one piece of SNSSAI corresponds to one network slice, one SST corresponds to one or more network slices, and one network slice set identifier corresponds to one or more network slices.

In a possible design, before receiving the cell reselection information sent by the radio access network device, the communications unit is further configured to send a first request to the radio access network device, where the first request is used to request the radio access network device to send the cell reselection information. The communications unit being configured to receive cell reselection information sent by a radio access network device is specifically: receiving the cell reselection information broadcasted by the radio access network device by using a random access response message (for example, a msg2 or a msg4 in an LTE or 5G system); or receiving the cell reselection information broadcasted by the radio access network device through a broadcast channel. The radio access network device broadcasts the cell reselection information only after receiving the request sent by the terminal device, instead of always broadcasting the cell reselection information. Compared with a manner in which the radio access network device always broadcasts the cell reselection information, this can reduce broadcast signaling overheads.

According to a fifth aspect, an embodiment of the present invention further provides another radio access network device. The radio access network device implements functions of the radio access network device in the cell reselection method in the first aspect, and therefore can also implement beneficial effects of the cell reselection method in the first aspect. The functions of the radio access network device may be implemented by hardware, or may be implemented by hardware executing corresponding software. The hardware or the software includes at least one module corresponding to the foregoing functions. The radio access network device includes a transceiver and a processor that respectively implement functions corresponding to the communications unit and the processing unit of the radio access network device in the third aspect.

According to a sixth aspect, an embodiment of the present invention further provides another terminal device. The terminal device implements functions of the terminal device in the cell reselection method in the second aspect, and therefore can also implement beneficial effects of the cell reselection method in the second aspect. The functions of the terminal device may be implemented by hardware, or may be implemented by hardware executing corresponding software. The hardware or the software includes at least one module corresponding to the foregoing functions. The terminal device includes a transceiver and a processor that respectively implement functions corresponding to the communications unit and the processing unit of the terminal device in the fourth aspect.

According to a seventh aspect, this application provides an apparatus. The apparatus may include a processor, and one or more interfaces coupled to the processor. The processor may be configured to: invoke, from a memory, an implementation program of the cell reselection method provided in the first aspect or the cell reselection method provided in any one of the possible implementations of the first aspect, and execute an instruction included in the program. The interface may be configured to output an execution result of the processor.

According to an eighth aspect, this application provides an apparatus. The apparatus may include a processor, and one or more interfaces coupled to the processor. The processor may be configured to: invoke, from a memory, an implementation program of the cell reselection method provided in the second aspect or the cell reselection method provided in any one of the possible implementations of the second aspect, and execute an instruction included in the program. The interface may be configured to output an execution result of the processor.

According to a ninth aspect, an embodiment of the present invention further provides a communications system, including: a radio access network device and a terminal device. The radio access network device is the radio access network device in the third aspect or the fifth aspect, and the terminal device is the terminal device in the fourth aspect or the sixth aspect.

According to a tenth aspect, an embodiment of the present invention provides a computer storage medium, configured to store a computer software instruction used by the radio access network device in the first aspect. When the instruction is executed by the radio access network device, the radio access network device is enabled to perform the method in the first aspect.

According to an eleventh aspect, an embodiment of the present invention provides another computer storage medium, configured to store a computer software instruction used by the terminal device in the second aspect. When the instruction is executed by the terminal device, the terminal device is enabled to perform the method in the second aspect.

According to a twelfth aspect, an embodiment of the present invention provides a computer program, where the program includes a computer software instruction. When the instruction is executed by the radio access network device, the radio access network device is enabled to perform the method in the first aspect.

According to a thirteenth aspect, an embodiment of the present invention provides another computer program, where the program includes a computer software instruction. When the instruction is executed by the terminal device, the terminal device is enabled to perform the method in the second aspect.

In this embodiment of the present invention, the radio access network device sends the cell reselection information to the terminal device in the broadcast manner or by using the RRC message, where the identifier of the network slice supported by each carrier frequency is newly added to the cell reselection information. Therefore, during cell reselection, the terminal device may perform cell reselection based on a network slice supported by the terminal device and the network slice supported by each carrier frequency. In this way, cases in which the terminal device reselects a cell that does not support a network slice supported by the terminal device can be reduced, and signaling overheads generated because the terminal device performs ineffective cell reselection can be reduced.

DESCRIPTION OF EMBODIMENTS

Figure 1:
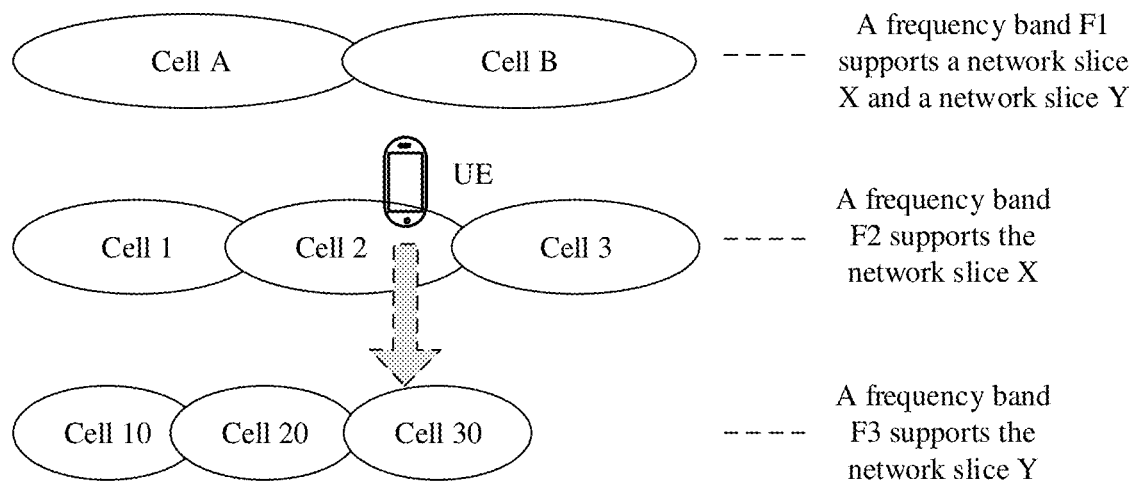
FIG. 1 is a schematic diagram of a cell reselection process according to an embodiment of the present invention.
Figure 2:
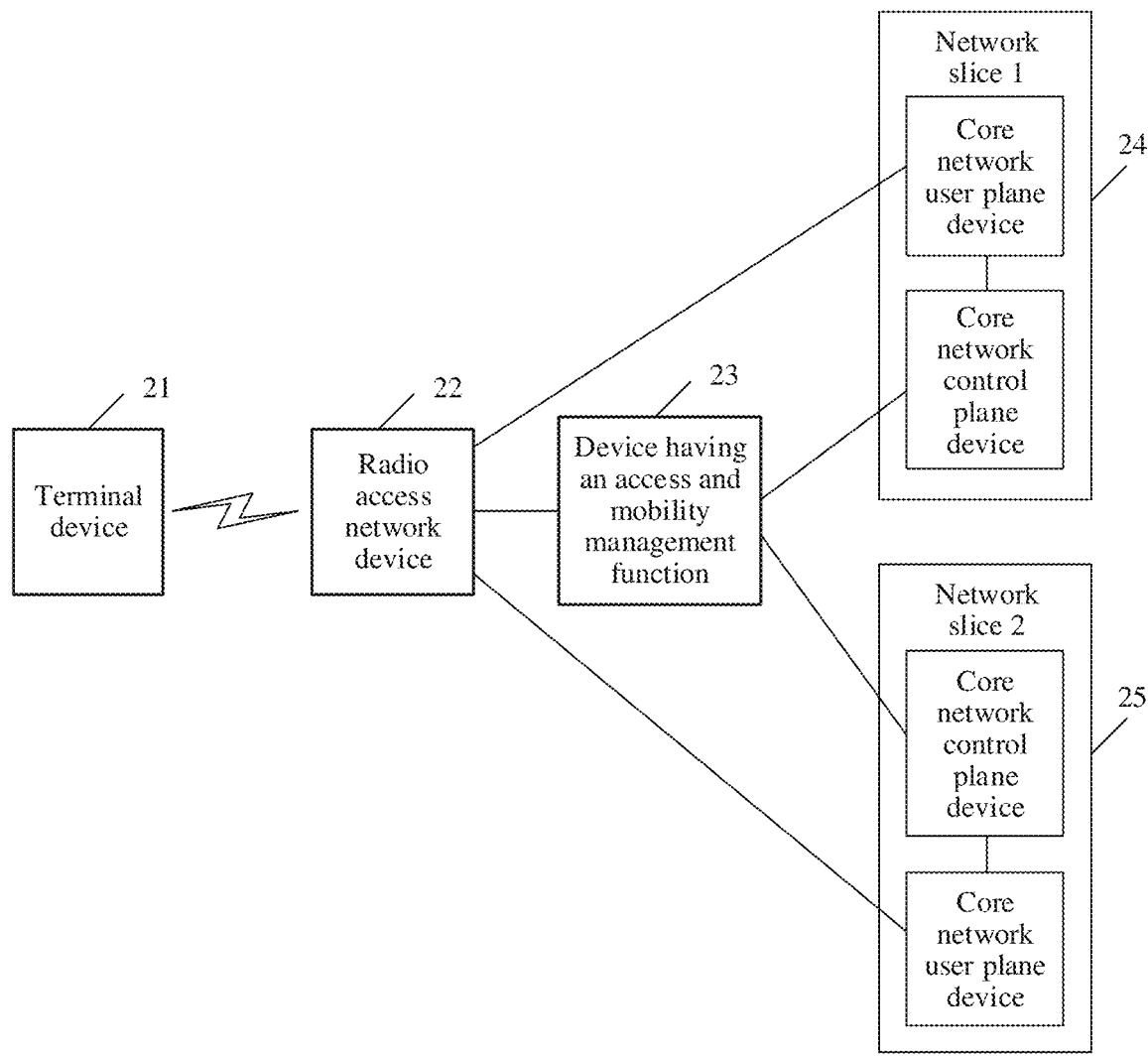
FIG. 2 is a schematic architecture diagram of a network system according to an embodiment of the present invention.

FIG. 2 is a schematic architecture diagram of a network system according to an embodiment of the present invention. As shown in FIG. 2, the network system includes a terminal device 21, a radio access network (RAN) device 22, a device 23 having an access and mobility management function (AMF), a dedicated (dedicated) core network device (including a core network control plane device and a core network user plane device) 24 of a network slice 1, and a dedicated core network device (including a core network control plane device and a core network user plane device) 25 of a network slice 2. A service carrier frequency of the radio access network device 22 is F1, and the terminal device 21 supports the network slice 1 and the network slice 2. The terminal device 21 initially camps on a cell of the radio access network device 22.

A device that can perform data communication with a radio access network device may be considered as a terminal device. The terminal device may also be referred to as user equipment, a mobile station, an access terminal, a subscriber unit, a subscriber station, a remote station, a remote terminal, a mobile device, a user terminal, a terminal, a wireless communications device, a user agent, a user apparatus, or the like. The terminal device may be a handheld terminal device, a notebook computer, a subscriber unit, a cellular phone, a smartphone, a wireless data card, a personal digital processing (PDA), a handheld device with a wireless communication function, a vehicle-mounted device, a wearable device, a mobile station in a future 5G network, a terminal device in a future evolved public land mobile network (PLMN), or the like. A terminal device and a radio access network device communicate with each other by using an air interface technology.

The radio access network device is mainly responsible for functions on an air interface side such as radio resource management, quality of service (QoS) management, and data compression and encryption. The radio access network device may include various forms of radio access network devices, for example, a macro radio access network device, a micro radio access network device (also referred to as a small cell), a relay station, and an access point. In systems using different radio access technologies, a device having a function of a radio access network device may have different names. For example, in a 5G communications system, the device is referred to as a next-generation NodeB (gNB). In an LTE system, the device is referred to as an evolved NodeB (eNB or eNodeB). In a 3rd-generation (3G) system, the device is referred to as a nodeB (Node B).

The device 23 having the AMF is a core network element. In a specific implementation, the device 23 having the AMF may be any entity device having an access and mobility management function. The device 23 having the AMF is mainly responsible for signaling processing, that is, a control plane function, including functions such as access control, mobility management, and attachment and detachment. In addition, the device 23 having the AMF may further select a network slice that the terminal device accesses. For example, when initially accessing a network or performs tracking area update (TAU), the terminal device provides network slice selection assistance information (NSSAI) to the device 23 having the AMF. The NSSAI includes one piece of SNSSAI or a group of pieces of SNSSAI, and one piece of SNSSAI may be used to determine one network slice. A group of pieces of SNSSAI may be used to determine one or more network slices. The device 23 having the AMF or another core network device selects a network slice instance for the terminal device based on one or more pieces of SNSSAI included in NSSAI.

It should be noted that each piece of SNSSAI may include an SST, used to indicate a specific feature and a specific service type of the network slice. Optionally, each piece of SNSSAI may further include a slice differentiator (SD). As a supplement to the SST, the slice differentiator may be used to further distinguish a plurality of network slice instances that having a same SST. In other words, when different network slices can be distinguished by using the SST, the SNSSAI does not need to include the SD, and when different network slices cannot be distinguished by using the SST, the SNSSAI needs to include the SD. One SST may correspond to one or more network slices, and one piece of SNSSAI corresponds to one network slice. Three 5G application scenarios are defined in a 3GPP meeting, and include enhanced mobile broadband (eMBB), ultra-reliable low-latency communication (uRLLC), and massive machine-type communications (mMTC). Each application scenario may correspond to an SST. For example, an SST corresponding to eMBB is 00000000, an SST corresponding to URLLC is 00000001, and an SST corresponding to mMTC is 00000010. Further, if the eMBB application scenario involves a plurality of network slices, the plurality of network slices have a same SST. The plurality of network slices may be distinguished from each other based on SDs. SSTs may be classified in another manner. This is not specifically limited in this embodiment of the present invention.

In this embodiment of the present invention, network slices are obtained through slicing in a core network. All network slices share a radio access network device. For example, the network slice 1 and the network slice 2 in FIG. 2 share the radio access network device 22. In addition, all network slices share the device 23 having the AMF. Each network slice may have one or more dedicated core network control plane devices, and each network slice may also have one or more dedicated core network user plane devices. Functions provided by a dedicated core network control plane device of each network slice may include: session management and the like, to set up a session for the terminal device.

The terminal device 21 may simultaneously support one or more network slices. In other words, the terminal device 21 has a capability of simultaneously accessing one or more network slices. When the terminal device 21 simultaneously uses a plurality of network slices, that is, when the terminal device 21 transmits service data corresponding to the plurality of network slices, if the radio access network device 22 supports the plurality of network slices, the terminal device 21 needs to establish only one RRC connection to the radio access network device 22, and the device 23 having the AMF may simultaneously serve the plurality of network slices used by the terminal device 21. For example, in FIG. 2, the terminal device 21 may transmit, by using the radio access network device 22, data of the network slice 1 to a core network user plane device corresponding to the network slice 1, and the terminal device 21 transmits, by using the radio access network device 22, data of the network slice 2 to a core network user plane device corresponding to the network slice 2.

In this embodiment of the present invention, there is a plurality of radio access network devices around a location of the terminal device 21 in the network system, each radio access network device has one or more carrier frequencies, and the radio access network device controls one or more cells on each carrier frequency. A plurality of cells on a same carrier frequency may be controlled by different radio access network devices. For example, the terminal device camps on a gNB1, cells of the gNB1 include a cell 1 and a cell 2, a neighboring access network device of the gNB1 includes a gNB2, and cells of the gNB2 include a cell 3 and a cell 4. Both carrier frequencies corresponding to the cell 1 and the cell 3 are F1, a carrier frequency corresponding to the cell 2 is F2, and a serving carrier frequency corresponding to the cell 4 is F3. Therefore, during cell reselection, the terminal device may reselect a cell on another carrier frequency, or may reselect a cell that has a same carrier frequency as that of a currently camped cell but that is of another radio access network device, to camp on the reselected cell.

That a carrier frequency supports the network slice 1 means that a cell on the carrier frequency may send, to a core network control plane device corresponding to the network slice 1, a session request that is of the network slice 1 and that is sent by a terminal device, to set up a session for the network slice 1, and the cell on the carrier frequency may send, to a core network user plane device corresponding to the network slice 1, data that is of the network slice 1 and that is sent by the terminal device. That a carrier frequency supports the network slice 2 means that a cell on the carrier frequency may send, to a core network control plane device corresponding to the network slice 2, a session request that is of the network slice 2 and that is sent by a terminal device, to set up a session for the network slice 2, and the cell on the carrier frequency may send, to a core network user plane device corresponding to the network slice 2, data that is of the network slice 2 and that is sent by the terminal device. That the terminal device supports the network slice 1 means that the terminal device may send, by using the radio access network device, a session request of the network slice 1 to the core network control plane device corresponding to the network slice 1, to set up a session for the network slice 1, and service data of the network slice 1 may be transmitted between the terminal device and the core network user plane device corresponding to the network slice 1. That the terminal device supports the network slice 2 means that the terminal device may send, by using the radio access network device, a session request of the network slice 2 to the core network control plane device corresponding to the network slice 2, to set up a session for the network slice 2, and service data of the network slice 2 may be transmitted between the terminal device and the core network user plane device corresponding to the network slice 2.

In this embodiment of the present invention, application scenarios in which the terminal device 21 performs cell reselection include but are not limited to the following types:

The terminal device 21 camps on the cell of the radio access network device 22. When the terminal device 21 learns through measurement that signal quality of the cell is less than a preset threshold, the terminal device 21 needs to reselect a cell. The terminal device 21 selects, based on the cell reselection information sent by the radio access network device 22, one of carrier frequencies that support the network slice supported by the terminal device 21 as a target carrier frequency, selects a cell on the target carrier frequency as a reselected to-be-camped cell, and then camps on the to-be-camped cell.

Alternatively, the terminal device 21 camps on the cell of the radio access network device 22, and the terminal device 21 learns, based on the cell reselection information sent by the radio access network device 22, that both the carrier frequency F1 and the carrier frequency F2 support the network slice 1 and the network slice 2, and a priority of the carrier frequency F2 is higher than a priority of the carrier frequency F1, and the carrier frequency F3 supports neither the network slice 1 nor the network slice 2. The terminal device 21 needs to perform cell reselection, selects the carrier frequency F2 as a target carrier frequency, and then selects a cell on the carrier frequency F2 as a reselected to-be-camped cell.

Alternatively, the terminal device 21 camps on the cell of the radio access network device 22, and the terminal device 21 learns, based on the cell reselection information sent by the radio access network device 22, that both the carrier frequency F1 and the carrier frequency F2 support the network slice 1 and the network slice 2. In addition, the terminal device 21 learns, through measurement, that signal quality of a cell on the carrier frequency F2 is higher than signal quality of a currently camped cell by a specific threshold. In this case, the terminal device 21 needs to perform cell reselection, selects the carrier frequency F2 as a target carrier frequency, and then selects a cell on the carrier frequency F2 as a reselected to-be-camped cell.

Alternatively, the terminal device 21 camps on the cell of the radio access network device 22, and when learning, through measurement, that signal quality of the cell is less than the preset threshold, the terminal device 21 learns, based on the cell reselection information sent by the radio access network device 22, that the carrier frequency F1 supports the network slice 1 and the network slice 2. In addition, the terminal device 21 learns, through measurement, that signal quality of another cell 2 on the carrier frequency F1 is higher than signal quality of the currently camped cell by a specific threshold. In this case, the terminal device 21 needs to perform cell reselection, selects the carrier frequency F1 as a target carrier frequency, and then selects the cell 2 on the carrier frequency F1 as a to-be-camped cell.

Alternatively, the terminal device 21 camps on the cell of the radio access network device 22, and the terminal device 21 learns, based on the cell reselection information sent by the radio access network device 22, that the carrier frequency F1 and the carrier frequency F3 support neither the network slice 1 nor the network slice 2, and the carrier frequency F2 supports the network slice 1 and the network slice 2. In this case, the terminal device 21 needs to perform cell reselection, and selects the carrier frequency F2 as a target carrier frequency. After selecting the target carrier frequency, the terminal device 21 performs blind detection on the target carrier frequency, to determine whether a cell whose signal quality is higher than that of a currently camped cell by a specific threshold exists on the target carrier frequency. If yes, the terminal device 21 selects the cell whose signal quality is higher than that of the currently camped cell by the specific threshold as the reselected to-be-camped cell. Therefore, in the solutions in the embodiments of the present invention, when a terminal device performs cell reselection, cases in which the terminal device reselects a carrier frequency that cannot support a network slice supported by the terminal device can be reduced, and cell reselection efficiency can be improved.

States of the terminal device in the following embodiments are described, and the states of the terminal device include: an idle state, an inactive state, and a connected (connected) state. When an RRC connection exists between the terminal device and the radio access network device, the terminal device is in the connected state, and data can be transmitted between the terminal device and the radio access network device. After data transmission between the terminal device and the radio access network device stops, an RRC connection between the terminal device and the radio access network device may be released, and the terminal device enters the idle state. Releasing the RRC connection means releasing all radio bearers established between the terminal device and the radio access network device. After the RRC connection between the terminal device and the radio access network device suspends, the terminal device enters the inactive state. Suspending the RRC connection means suspending all radio bearers established between the terminal device and the radio access network device. The terminal device in the idle state or the inactive state may perform cell reselection.

An identifier of a network slice in the following embodiments is described. The identifier of the network slice may be SNSSAI corresponding to the network slice, or may be an SST corresponding to the network slice, or may be a network slice set identifier corresponding to the network slice. One network slice corresponds to one piece of SNSSAI, one piece of NSSAI corresponds to one or more pieces of SNSSAI, one SST corresponds to one or more pieces of SNSSAI, and one network slice set identifier corresponds to one or more pieces of SNSSAI. In addition, the network slice set identifier is different from the SST, and a plurality of network slices corresponding to a same network slice set identifier may correspond to different SSTs. The network slice set identifier may be obtained by grouping a plurality of network slices into different network slice sets by the radio access network device or the device 23 having the AMF, and each network slice set corresponds to one network slice set identifier. For example, a network slice 1, a network slice 2, a network slice 3, and a network slice 4 are used for description, and SNSSAI of the four network slices may be, for example, SNSSAI1, SNSSAI2, SNSSAI3, and SNSSAI4. The network slice 1 and the network slice 2 belong to an eMBB service type, and a corresponding SST may be, for example, 00000000. The network slice 3 and the network slice 4 belong to a URLLC service type, and a corresponding SST may be, for example, 00000001. The radio access network device groups the network slice 1 and the network slice 3 into a network slice set, where a corresponding network slice set identifier may be, for example, S1, and groups the network slice 2 and the network slice 4 into another network slice set, where a corresponding network slice set identifier may be, for example, S2.

In the following embodiments, a quantity of cells on each carrier frequency is not limited. A manner in which the terminal device selects a cell on the target carrier frequency as the reselected to-be-camped cell is not specifically limited. For example, the terminal device may alternatively select a cell whose signal quality meets a preset condition on the target carrier frequency as the to-be-camped cell. For example, a cell whose cell quality is greater than that of the current cell by a threshold is selected as the to-be-camped cell, or a cell whose signal quality is the best is selected as the to-be-camped cell.

Figure 3:
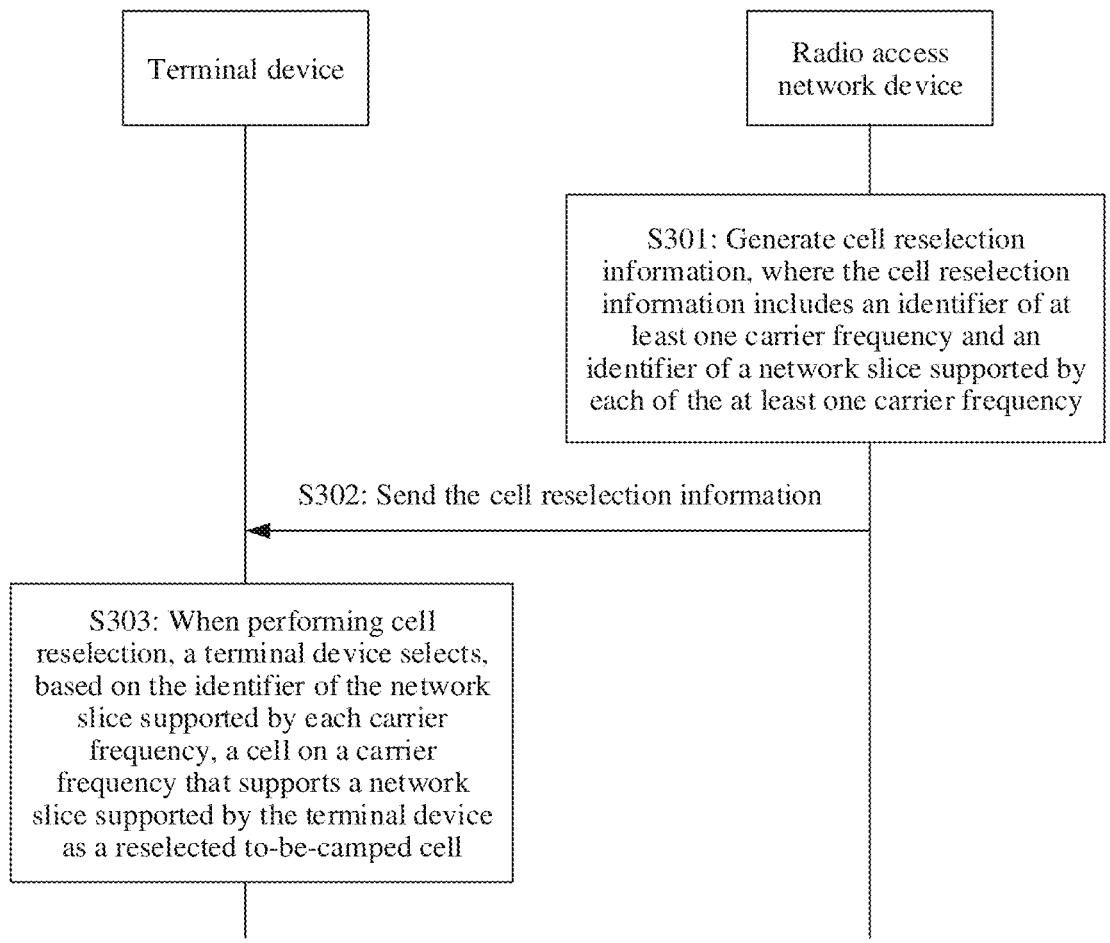
FIG. 3 is a schematic flowchart of a cell reselection method according to an embodiment of the present invention.

Based on the network architecture shown in FIG. 2, a cell reselection method provided in an embodiment of the present invention is described with reference to FIG. 3. As shown in FIG. 3, the cell reselection method includes but is not limited to the following steps S301 to S303.

S301: A radio access network device generates cell reselection information, where the cell reselection information includes an identifier of at least one carrier frequency and an identifier of a network slice supported by each of the at least one carrier frequency.

S302: The radio access network device sends the cell reselection information to the terminal device.

The identifier of the carrier frequency may be specifically a carrier frequency ID, a frequency value of the carrier frequency, or the like. For example, a carrier frequency ID of the carrier frequency F1 is F001, a carrier frequency ID of the carrier frequency F2 is F002, a carrier frequency ID of the carrier frequency F3 is F003, a frequency value of the carrier frequency F1 is 890.2 MHz, a frequency value of the carrier frequency F2 is 890 MHz, and a frequency value of the carrier frequency F3 is 890.4 MHz. The at least one carrier frequency includes a serving carrier frequency of the radio access network device and/or a neighboring carrier frequency of the radio access network device or another carrier frequency.

Application scenarios of the embodiments of the present invention mainly include two types: In a first application scenario, the terminal device is in an idle state or an inactive state, and an RRC connection with the radio access network device does not exist or suspends. The radio access network device generates the cell reselection information, and broadcasts the cell reselection information to the terminal device, so that when the terminal device needs to perform cell reselection, the terminal device can reselect, based on the cell reselection information, a carrier frequency that supports a network slice supported by the terminal device.

In a second application scenario, the radio access network device adds the cell reselection information to an RRC message and sends the cell reselection information to the terminal device, so that when the terminal device needs to perform cell reselection, the terminal device can reselect, based on the cell reselection information, a carrier frequency that supports a network slice supported by the terminal device. For example, an RRC connection between the terminal device and the radio access network device exists, and the radio access network device generates the cell reselection information. After data transmission between the terminal device and the radio access network device stops, the RRC connection needs to be released. The radio access network device adds the cell reselection information to an RRC connection release message and sends the cell reselection information to the terminal device. Alternatively, after the terminal device sends an RRC connection request for the network slice 1 to the radio access network device, because the radio access network device does not support the network slice 1, the radio access network device rejects establishment of an RRC connection. The radio access network device adds the cell reselection information to an RRC connection rejection message and sends the cell reselection information to the terminal device, so that when the terminal device needs to perform cell reselection, the terminal device can reselect, based on the cell reselection information, a carrier frequency that supports a network slice supported by the terminal device. The radio access network device may alternatively add the cell reselection information to another RRC message and send the cell reselection information to the terminal device. This is not specifically limited in this embodiment of the present invention.

The following separately describes the foregoing two application scenarios.

In the foregoing first application scenario, the identifier of the network slice may be slice service type information, that is, an SST, corresponding to the network slice. This is because of the following reason: The terminal device can support a plurality of network slices, and when there are a relatively large quantity of network slices, broadcasting a large quantity of network slice identifiers causes a large quantity of signaling overheads. One SST may correspond to one or more network slices. Therefore, broadcasting the SST instead of broadcasting SNSSAI can reduce broadcast signaling overheads of the radio access network device.

In addition, the SST may be obtained by the terminal device by sending a first request to the radio access network device. The first request is used to instruct the radio access network device to send the cell reselection information to the terminal device. After receiving the first request sent by the terminal device, the radio access network device generates the cell reselection information that includes the identifier of the carrier frequency and the SST supported by each carrier frequency, and broadcasts the cell reselection information to the terminal device by using a random access response message (for example, a msg2 or a msg4 in a random access procedure in an LTE or 5G system). When a relatively large quantity of terminal devices that simultaneously request to obtain the cell reselection information, the radio access network device may further broadcast the cell reselection information to each terminal device through a broadcast channel. This has the following benefit: The radio access network device broadcasts the cell reselection information only after receiving the request sent by the terminal device, instead of always broadcasting the cell reselection information. Compared with a manner in which the radio access network device always broadcasts the cell reselection information, this can reduce broadcast signaling overheads.

For example, the terminal device in the idle state receives a broadcast message of a gNB1. A serving carrier frequency of the gNB1 is F1, and neighboring carrier frequencies or other carrier frequencies of F1 are F2, F3, and F4. In this case, the at least one carrier frequency included in the cell reselection information broadcasted by the gNB1 to the terminal device includes the carrier frequency F1, the carrier frequency F2, the carrier frequency F3, or the carrier frequency F4. Network slices supported by the carrier frequency F1 include a network slice 1, a network slice 2, and a network slice 3, network slices supported by the carrier frequency F2 include the network slice 1 and a network slice 4, network slices supported by the carrier frequency F3 include the network slice 2, the network slice 3, and a network slice 5, and network slices supported by the carrier frequency F4 include the network slice 3 and the network slice 5. SSTs corresponding to the network slice 1 and the network slice 2 are an SST1, and SSTs corresponding to the network slice 3, the network slice 4, and the network slice 5 are an SST2. In a specific implementation, an identifier of the SST1 may be 00000000 corresponding to an eMBB service, and an identifier of the SST2 may be 00000001 corresponding to the URLLC. An example in which an identifier of the carrier frequency F1 is F001, an identifier of the carrier frequency F2 is F002, an identifier of the carrier frequency F3 is F003, and an identifier of the carrier frequency F4 is F004 is used for description. Therefore, in this embodiment of the present invention, for the identifier of the carrier frequency and the identifier of the SST that are included in the cell reselection information, refer to a mapping table shown in the following Table 1 or Table 2.

TABLE 1

| Identifier of a carrier frequency | Identifier of an SST |
|---|---|
| F001 | SST1 and SST2 |
| F002 | SST1 and SST2 |
| F003 | SST1 and SST2 |
| F004 | SST2 |

TABLE 2

| Identifier of an SST | Identifier of a carrier frequency |
|---|---|
| SST1 | F001, F002, and F003 |
| SST2 | F001, F002, F003, and F004 |

Optionally, in addition to the identifier of the carrier frequency and the identifier of the SST supported by each carrier frequency, the cell reselection information may further include priority information corresponding to each carrier frequency. For example, priorities of the carrier frequency F1, the carrier frequency F2, the carrier frequency F3, and the carrier frequency F4 are a first priority, a second priority, a third priority, and a fourth priority respectively. That is, the priorities of the carrier frequency F1, the carrier frequency F2, the carrier frequency F3, and the carrier frequency F4 decrease sequentially. Table 3 is an example of a mapping table of an identifier of a carrier frequency, an identifier of an SST supported by each carrier frequency, and a priority of each carrier frequency that are included in the cell reselection information.

TABLE 3

| Identifier of a carrier frequency | Identifier of an SST | Priority of a carrier frequency |
|---|---|---|
| F001 | SST1 and SST2 | First priority |
| F002 | SST1 and SST2 | Second priority |
| F003 | SST1 and SST2 | Third priority |
| F004 | SST2 | Fourth priority |

Optionally, in addition to the identifier of the carrier frequency and the identifier of the SST supported by each carrier frequency, the cell reselection information may further include priority information corresponding to each SST. For example, a priority of the SST1 is the first priority, and a priority of the SST2 is the second priority, that is, the priority of the SST1 is higher than that of the SST2. Table 4 is an example of a mapping table of an identifier of a carrier frequency, an identifier of an SST supported by each carrier frequency, and a priority of each SST that are included in the cell reselection information.

TABLE 4

| Identifier of an SST | Identifier of a carrier frequency | Priority of an SST |
|---|---|---|
| SST1 | F001, F002, and F003 | First priority |
| SST2 | F001, F002, F003, and F004 | Second priority |

In the foregoing second application scenario, the radio access network device sends the cell reselection information to the terminal device by using an RRC message. The identifier of the network slice may be SNSSAI corresponding to the network slice. When the SNSSAI does not include an SD, that is, when different network slices can be distinguished by using the SST, the identifier of the network slice may also be an SST corresponding to the network slice. When the SNSSAI includes an SD, the identifier of the network slice may also be the SST corresponding to the network slice. In this embodiment of the present invention, each carrier frequency included in the cell reselection information supports the network slice supported by the terminal device, and the network slice supported by each carrier frequency is some or all of network slices supported by the terminal device. Therefore, when performing cell reselection based on the cell reselection information, the terminal device in the idle state or the inactive state may perform cell reselection based on the network slice supported by the terminal device and the network slice supported by each carrier frequency. In this way, cases in which the terminal device reselects a cell that does not support a network slice supported by the terminal device can be reduced, and signaling overheads generated because the terminal device performs ineffective cell reselection can be reduced.

For example, network slices supported by the terminal device include a network slice 1 and a network slice 2. For example, an identifier of the network slice 1 is SNSSAI1, and an identifier of the network slice 2 is SNSSAI2. An RRC connection exists between the terminal device and a gNB1. A serving carrier frequency of the gNB1 is F1, and neighboring or other carrier frequencies of F1 are F2, F3, and F4. However, F2 and F3 can support the network slice 1 or the network slice 2, and the carrier frequency F4 supports neither the network slice 1 nor the network slice 2. In this case, the at least one carrier frequency included in the cell reselection information includes the carrier frequency F1, the carrier frequency F2, and the carrier frequency F3, and does not include the carrier frequency F4. The carrier frequency F1 can support the network slice 1 and the network slice 2, the carrier frequency F2 can support the network slice 1, and the carrier frequency F3 can support the network slice 2. An example in which an identifier of the carrier frequency F1 is F001, an identifier of the carrier frequency F2 is F002, and an identifier of the carrier frequency F3 is F003 is used for description. Therefore, in this embodiment of the present invention, for the identifier of the carrier frequency and a format of SNSSAI of a network slice that are included in the cell reselection information, refer to a mapping table shown in the following Table 5 or Table 6.

TABLE 5

| Identifier of a carrier frequency | Identifier of a network slice |
| --- | --- |
| F001 | SNSSAI1 and SNSSAI2 |
| F002 | SNSSAI1 |
| F003 | SNSSAI2 |

TABLE 6

| Identifier of a carrier frequency | Identifier of a network slice |
| --- | --- |
| F001 and F002 | SNSSAI1 |
| F001 and F003 | SNSSAI2 |

In this embodiment of the present invention, the network slice corresponding to each carrier frequency included in the cell reselection information includes some or all of the network slices supported by the terminal device. In other words, each carrier frequency can support a plurality of network slices, and network slices corresponding to the carrier frequency carried in the cell reselection information all belong to the network slices supported by the terminal device. An identifier of a network slice of the network slices supported by the carrier frequency other than the network slice supported by the terminal device does not need to be carried in the cell reselection information. For example, the network slices supported by the terminal device include the network slice 1 and the network slice 2. In addition to the network slices supported by the carrier frequencies included in Table 1 or Table 2, the carrier frequency F1 may further support a network slice 3, the carrier frequency F2 may further support a network slice 4, and the carrier frequency F3 may further support a network slice 3 and a network slice 5. However, neither Table 1 nor Table 2 includes identifiers of the network slice 3, the network slice 4, and the network slice 5. This is because the terminal device does not support these network slices, and identifiers of the network slices not supported by the terminal device do not need to be added to the cell reselection information to occupy a transmission resource.

Optionally, the cell reselection information further includes priority information corresponding to each carrier frequency. For example, priorities of the carrier frequency F1, the carrier frequency F2, and the carrier frequency F3 are a first priority, a second priority, and a third priority respectively. That is, the priorities of the carrier frequency F1, the carrier frequency F2, and the carrier frequency F3 decrease sequentially. Table 7 is an example of a mapping table of an identifier of a carrier frequency, SNSSAI supported by each carrier frequency, and a priority of each carrier frequency that are included in the cell reselection information.

TABLE 7

| Identifier of a carrier frequency | Identifier of a network slice | Priority of a carrier frequency |
| --- | --- | --- |
| F001 | SNSSAI1 and SNSSAI2 | First priority |
| F002 | SNSSAI1 | Second priority |
| F003 | SNSSAI2 | Third priority |

Optionally, the cell reselection information further includes priority information corresponding to each network slice. For example, the terminal device supports the network slice 1 and the network slice 2, a priority of the network slice 1 is a first priority, and a priority of the network slice 2 is a second priority, that is, the priority of the network slice 1 is higher than that of the network slice 2. Table 8 is an example of a mapping table of an identifier of a carrier frequency, an identifier of a network slice supported by each carrier frequency, and a priority of each network slice that are included in cell reselection information.

TABLE 8

| Identifier of a carrier frequency | Identifier of a network slice | Priority of a network slice |
| --- | --- | --- |
| F001 and F002 | SNSSAI1 | First priority |
| F001 and F003 | SNSSAI2 | Second priority |

Alternatively, the identifier of the network slice may be an SST corresponding to the network slice. In this case, for an example of the identifier of the carrier frequency and the SST supported by each carrier frequency, where the identifier of the carrier frequency and the SST supported by each carrier frequency are carried in the cell reselection information sent by the radio access network device by using the RRC message, refer to Table 1 or Table 2. When the cell reselection information further includes a priority of a carrier frequency, for an example of the identifier of the carrier frequency, the SST supported by each carrier frequency, and the priority of each carrier frequency, where the identifier of the carrier frequency, the SST supported by each carrier frequency, and the priority of each carrier frequency are carried in the cell reselection information sent by the radio access network device by using the RRC message, refer to Table 3. When the cell reselection information further includes a priority of an SST, for an example of the identifier of the carrier frequency, the SST supported by each carrier frequency, and the priority of each SST, where the identifier of the carrier frequency, the SST supported by each carrier frequency, and the priority of each SST are carried in the cell reselection information sent by the radio access network device by using the RRC message, refer to Table 4.

Optionally, if the radio access network device adds the cell reselection information to the RRC connection release message or the RRC connection reject message and sends the cell reselection information to the terminal device, the cell reselection information may further include an identifier of a first network slice that causes an RRC connection of the terminal device to be released or rejected. The identifier of the first network slice is used to instruct the terminal device to reselect, during cell reselection, a cell on a carrier frequency that supports a network slice other than the first network slice as a reselected to-be-camped cell. The RRC connection release message is used as an example. The identifier of the first network slice may be carried in load-BalancingTAUrequired information in the RRC connection release message. For example, the loadBalancingTAUrequired information carried in the RRC connection release message is loadBalancingTAUrequired-SNSSAI1. Herein, SNSSAI1 indicates that the RRC connection between the terminal device and the gNB1 is released because of network congestion triggered by the network slice 1. The network slice 1 is the first network slice. In this case, when performing cell reselection, the terminal device may reselect a cell on the carrier frequency that supports the network slice 2. In addition, when the terminal device sends an RRC connection request to the radio access network device again, the RRC connection request does not need to carry the identifier of the network slice 1, so that the radio access network device selects another AMF device, and connects the terminal device to the another AMF device.

In the foregoing first application scenario, the identifier of the network slice may alternatively be a network slice set identifier corresponding to the network slice. The network slice set identifier may alternatively have another name. This is not specifically limited in this embodiment of the present invention. This is because of the following reason: The terminal device can support a plurality of network slices, and when there are a relatively large quantity of network slices, broadcasting a large quantity of network slice identifiers causes a large quantity of signaling overheads. Therefore, broadcasting the network slice set identifier instead of broadcasting the SNSSAI can reduce broadcast signaling overheads of the radio access network device.

In addition, the network slice set identifier may be obtained by the terminal device by sending a first request to the radio access network device. The first request is used to instruct the radio access network device to send the cell reselection information to the terminal device. After receiving the first request sent by the terminal device, the radio access network device generates the cell reselection information that includes the identifier of the carrier frequency and the network slice set identifier supported by each carrier frequency, and sends the cell reselection information to the terminal device by using a random access response message (for example, a msg2 or a msg4) or another message. When a relatively large quantity of terminal devices that simultaneously request to obtain the cell reselection information, the radio access network device may further broadcast the cell reselection information to each terminal device in a broadcast manner. This has the following benefit: The radio access network device broadcasts the cell reselection information only after receiving the request sent by the terminal device, instead of always broadcasting the cell reselection information. Compared with a manner in which the radio access network device always broadcasts the cell reselection information, this can reduce broadcast signaling overheads.

For example, the RRC connection between the terminal device and the gNB1 is released, the terminal device enters the idle state, and the gNB1 broadcasts the cell reselection information to the terminal device. Specifically, the cell reselection information includes network slice set identifiers respectively corresponding to the serving carrier frequency F1 of the gNB1 and the neighboring carrier frequencies F2 and F3. For example, for content included in the cell reselection information broadcasted by the gNB1, refer to Table 9.

TABLE 9

| Identifier of a carrier frequency | Network slice set identifier |
|---|---|
| F1 | S1 |
| F2 | S1 and S2 |
| F3 | S2 |

Therefore, after receiving the cell reselection information broadcasted by the gNB1, with reference to a pre-stored mapping table (which may be shown in the following Table 10) between an identifier of a network slice and a network slice set identifier based on the network slice 1 and the network slice 2 supported by the terminal device, the terminal device can learn that a corresponding network slice set identifier is S1, and can learn, based on the received cell reselection information, that carrier frequencies that can support S1 include the carrier frequency F1 and the carrier frequency F2. Therefore, the terminal device selects the carrier frequency F1 or the carrier frequency F2 as a target carrier frequency. If the serving carrier of gNB1 is F1 and the terminal device selects the carrier frequency F2 as the target carrier frequency, a cross-TA cell reselection process is implemented.

TABLE 10

| Network slice set identifier | Identifier of a network slice |
|---|---|
| S1 | SNSSAI1 and SNSSAI2 |

Optionally, the cell reselection information further includes priority information corresponding to each carrier frequency. For example, priorities of the carrier frequency F1, the carrier frequency F2, and the carrier frequency F3 are a first priority, a second priority, and a third priority respectively. That is, the priorities of the carrier frequency F1, the carrier frequency F2, and the carrier frequency F3 decrease sequentially. Table 11 is an example of a mapping table of an identifier of a carrier frequency, an identifier of a network slice supported by each carrier frequency, and a priority of each carrier frequency that are included in cell reselection information.

TABLE 11

| Identifier of a carrier frequency | Network slice set identifier | Priority of a carrier frequency |
|---|---|---|
| F002 | S1 and S2 | First priority |
| F001 | S1 | Second priority |
| F003 | S2 | Third priority |

Optionally, in addition to the identifier of the carrier frequency and the network slice set identifier supported by each carrier frequency, the cell reselection information may further include priority information corresponding to each network slice set. For example, a priority of a network slice set 1 is a first priority, and a priority of a network slice set 2 is a second priority, that is, the priority of the network slice set 1 is higher than that of the network slice set 2. Table 12 is an example of a mapping table of an identifier of a carrier frequency, a network slice set identifier supported by each carrier frequency, and a priority of each network slice set that are included in cell reselection information.

TABLE 12

| Network slice set identifier | Identifier of a carrier frequency | Priority of a network slice set |
|---|---|---|
| S1 | F001 and F002 | First priority |
| S2 | F002 and F003 | Second priority |

S303: The terminal device receives the cell reselection information sent by the radio access network device, and when performing cell reselection, the terminal device selects, based on the cell reselection information, a cell on a carrier frequency that supports a network slice supported by the terminal device as a reselected to-be-camped cell.

In the foregoing first application scenario, if the cell reselection information broadcasted by the radio access network device includes the identifier of the carrier frequency and the SST supported by each carrier frequency, when performing cell reselection, the terminal device reselects, based on the SST supported by each carrier frequency and the SST supported by the terminal device, a carrier frequency that can support the SST supported by the terminal device as a target carrier frequency, to select a to-be-camped cell on the target carrier frequency.

For example, the network slice supported by the terminal device is the network slice 1, and an SST corresponding to the network slice 1 is an SST1. If learning, based on the cell reselection information broadcasted by the gNB1, that a carrier frequency that supports the SST1 includes only the carrier frequency F1, the terminal device selects the carrier frequency F1 as the target carrier frequency, and selects a cell on the carrier frequency F1 as the reselected to-be-camped cell.

Specifically, a manner in which the terminal device selects a cell on the target carrier frequency as the reselected to-be-camped cell is not specifically limited. For example, the terminal device may alternatively select a cell whose signal quality meets a preset condition on the target carrier frequency as the to-be-camped cell. For example, a cell whose cell quality is greater than that of the current cell by a threshold is selected as the to-be-camped cell, or a cell whose signal quality is the best is selected as the to-be-camped cell. For example, the target carrier frequency is F1, and four cells exist on the carrier frequency F1: a cell A, a cell B, a cell C, and a cell D. The terminal device separately measures signal quality of the four cells, and obtains measurement values: −86 dBm, −96 dBm, −106 dBm, and −116 dBm. In this case, the terminal device selects the cell A with highest signal quality as the reselected to-be-camped cell, and then the terminal device camps on the cell A.

If a plurality of carrier frequencies support the SST supported by the terminal device, the terminal device may further select a carrier frequency with best signal quality as the target carrier frequency based on signal quality of the plurality of carrier frequencies, to select a to-be-camped cell on the target carrier frequency.

For example, the network slice supported by the terminal device is the network slice 1, and an SST corresponding to the network slice 1 is an SST1. If learning, based on the cell reselection information broadcasted by the gNB1, that carrier frequencies that support the SST1 include the carrier frequency F1 and the carrier frequency F2, and learning, through measurement, that signal quality of the carrier frequency F1 is higher than signal quality of the carrier frequency F2, the terminal device selects the carrier frequency F1 as the target carrier frequency, to select a to-be-camped cell on the target carrier frequency.

If the cell reselection information further includes priority information corresponding to each carrier frequency in addition to the identifier of each carrier frequency and the SST information supported by each carrier frequency, when performing cell reselection, the terminal device selects, based on the identifier of the carrier frequency, the SST supported by each carrier frequency, and a priority of each carrier frequency, a carrier frequency that can support the SST supported by the terminal device and that has a highest priority as the target carrier frequency, to select a to-be-camped cell on the target carrier frequency.

For example, the network slices supported by the terminal device are the network slice 1 and the network slice 2, an SST corresponding to the network slice 1 is an SST1, and an SST corresponding to the network slice 2 is an SST2. If learning, based on the cell reselection information broadcasted by the gNB1, that a carrier frequency that supports the SST1 includes the carrier frequency F1, a carrier frequency that supports the SST2 includes the carrier frequency F2, and a priority of the carrier frequency F2 is higher than a priority of the carrier frequency F1, the terminal device selects the carrier frequency F2 as the target carrier frequency, to select a to-be-camped cell on the carrier frequency F2.

In an optional implementation, when a plurality of carrier frequencies can support the SST supported by the terminal device, the terminal device may further select a carrier frequency with a highest priority as the target carrier frequency based on a priority of each carrier frequency, to select a to-be-camped cell on the target carrier frequency.

For example, the network slice supported by the terminal device is the network slice 1, and an SST corresponding to the network slice 1 is an SST1. If learning, based on the cell reselection information broadcasted by the gNB1, that carrier frequencies that support the SST1 include the carrier frequency F1 and the carrier frequency F2, and a priority of the carrier frequency F2 is higher than a priority of the carrier frequency F1, the terminal device selects the carrier frequency F2 as the target carrier frequency, to select a to-be-camped cell on the carrier frequency F2.

If the cell reselection information further includes priority information corresponding to each SST in addition to the identifier of each carrier frequency and the SST information supported by each carrier frequency, when performing cell reselection, the terminal device selects, based on the identifier of the carrier frequency, the SST supported by each carrier frequency, and a priority of each SST, a carrier frequency that can support a highest-priority SST supported by the terminal device as the target carrier frequency, to select a to-be-camped cell on the target carrier frequency.

For example, the network slices supported by the terminal device are the network slice 1 and the network slice 2, an SST corresponding to the network slice 1 is an SST1, and an SST corresponding to the network slice 2 is an SST2. If learning, based on the cell reselection information broadcasted by the gNB1, that a carrier frequency that supports the SST1 includes the carrier frequency F1, a carrier frequency that supports the SST2 includes the carrier frequency F2, and a priority of the SST1 is higher than a priority of the SST2, the terminal device selects the carrier frequency F1 as the target carrier frequency, to select a to-be-camped cell on the carrier frequency F1.

During implementation of this embodiment of the present invention, the radio access network device broadcasts the cell reselection information to the terminal device. When the terminal device in the idle state or the inactive state performs cell reselection, the terminal device reselects, based on the cell reselection information, the cell that can support the SST supported by the terminal device. Therefore, cases in which the terminal device performs ineffective cell reselection are reduced, signaling overheads are reduced, and cell reselection efficiency is improved.

If the cell reselection information broadcasted by the radio access network device includes the identifier of the carrier frequency and the network slice set identifier corresponding to each carrier frequency, when performing cell reselection, the terminal device selects, based on the network slice set identifier corresponding to each carrier frequency carried in the cell reselection information, a mapping relationship between a network slice set identifier and a network slice identifier, and the network slice supported by the terminal device, a carrier frequency that can support the network slice supported by the terminal device as the target carrier frequency, and select a cell on the target carrier frequency as the to-be-camped cell.

For example, the network slices supported by the terminal device are the network slice 1 and the network slice 2, and it is learned, based on the mapping relationship shown in Table 10, that the network slice 1 and the network slice 2 correspond to the network slice set identifier S1. In this case, the terminal device selects a carrier frequency that supports S1 as the target carrier frequency. It can be learned from Table 9 that the carrier frequencies that support S1 include the carrier frequency F1 and the carrier frequency F2. Therefore, the terminal device may select F2 from the two carrier frequencies as the target carrier frequency, to select a to-be-camped cell on the carrier frequency F2.

If the cell reselection information further includes priority information corresponding to each carrier frequency, when performing cell reselection, the terminal device selects, based on the network slice set identifier corresponding to each carrier frequency, a mapping relationship between a network slice identifier and a network slice set identifier, and a priority of each carrier frequency, a carrier frequency that can support the network slice supported by the terminal device and that has a highest priority as the target carrier frequency, to select a to-be-camped cell on the target carrier frequency.

For example, in Table 11, a carrier frequency having a highest priority is F2. In this case, the terminal device selects the carrier frequency F2 as the target carrier frequency.

In an optional implementation, when a plurality of carrier frequencies can support the network slice supported by the terminal device, the terminal device may further select a carrier frequency with a highest priority as the target carrier frequency based on a priority of each carrier frequency, to select a to-be-camped cell on the carrier frequency F1.

If the cell reselection information further includes priority information corresponding to each network slice set in addition to the identifier of each carrier frequency and the network slice set identifier corresponding to each carrier frequency, when performing cell reselection, the terminal device selects, based on the identifier of the carrier frequency, the network slice set identifier corresponding to each carrier frequency, and a priority of each network slice set, a carrier frequency that can support a highest-priority network slice set supported by the terminal device as the target carrier frequency, to select a to-be-camped cell on the target carrier frequency.

For example, the network slices supported by the terminal device are the network slice 1 and the network slice 2, a network slice set identifier corresponding to the network slice 1 is S1, and a network slice set identifier corresponding to the network slice 2 is S2. If learning, based on the cell reselection information broadcasted by the gNB1, that a carrier frequency that supports S1 includes the carrier frequency F1, a carrier frequency that supports S2 includes the carrier frequency F2, and a priority of S1 is higher than a priority of S2, the terminal device selects the carrier frequency F1 as the target carrier frequency, to select a to-be-camped cell on the carrier frequency F1.

During implementation of this embodiment of the present invention, the radio access network device broadcasts the cell reselection information to the terminal device. When the terminal device in the idle state or the inactive state performs cell reselection, the terminal device reselects, based on the cell reselection information, the cell that can support the network slice supported by the terminal device. Therefore, cases in which the terminal device performs ineffective cell reselection are reduced, signaling overheads are reduced, and cell reselection efficiency is improved.

In the foregoing second application scenario, after the RRC connection between the terminal device and the radio access network device is released, the terminal device enters the idle state and needs to perform cell reselection. When performing cell reselection, the terminal device performs cell reselection based on the cell reselection information. Each carrier frequency carried in the cell reselection information is a carrier frequency that can support the network slice supported by the terminal device. Therefore, cases in which the terminal device reselects a carrier frequency that does not support the network slice supported by the terminal device and consequently cell reselection is ineffective can be reduced, and signaling overheads generated because the terminal device performs ineffective cell reselection are reduced.

Specifically, when performing cell reselection, the terminal device selects, based on the identifier of the network slice supported by each carrier frequency included in the cell reselection information, a carrier frequency that can support the network slice supported by the terminal device as a target carrier frequency, to select a to-be-camped cell on the target carrier frequency.

In an optional implementation, when the terminal device does not need to transmit service data, a manner in which the terminal device performs cell reselection based on the identifier of each carrier frequency and the identifier of the network slice supported by each carrier frequency may be as follows: the terminal device selects, based on the identifier of each carrier frequency and the network slice supported by each carrier frequency, a carrier frequency that supports a largest quantity of network slices as the target carrier frequency. For example, in Table 3, the carrier frequency F1 supports two network slices, and the carrier frequency F2 and the carrier frequency F3 each support one network slice. In this case, the terminal device may select the carrier frequency F1 as the target carrier frequency. If a plurality of carrier frequencies support a largest quantity of network slices, the terminal device may further select, based on signal quality of each carrier frequency, a carrier frequency with highest signal quality as the target carrier frequency. Alternatively, if a plurality of carrier frequencies supports a largest quantity of network slices, the terminal device may randomly select a carrier frequency as the target carrier frequency, to select a to-be-camped cell on the target carrier frequency.

In another optional implementation, the terminal device supports the network slice 1 and the network slice 2, the carrier frequency F2 supports only the network slice 1 and does not support the network slice 2, and an RRC connection exists between the terminal device and the radio access network device on the carrier frequency F2, to transmit data of the network slice 1. If the terminal device needs to transmit data of the network slice 2, cell reselection needs to be performed to select a carrier frequency that can support the network slice 2. In this case, a manner in which the terminal device performs cell reselection based on the identifier of each carrier frequency and the identifier of the network slice supported by each carrier frequency may be as follows: the terminal device selects, based on the identifier of each carrier frequency, the identifier of the network slice supported by each carrier frequency, and a network slice to which service data that currently needs to be transmitted belongs, a carrier frequency that can support the network slice to which the data currently to be transmitted belongs as the target carrier frequency. For example, in Table 3, the terminal device supports the network slice 1 and the network slice 2, and an RRC connection exists between the terminal device and the radio access network device on the carrier frequency F2, but service data that currently needs to be transmitted is data of the network slice 2. In this case, the terminal device may select the carrier frequency F1 as the target carrier frequency, or select the carrier frequency F3 as the target carrier frequency, and then select a cell on the target carrier frequency as the to-be-camped cell. If a plurality of carrier frequencies can support the network slice to which the service data currently to be transmitted belongs, the terminal device may further select a carrier frequency with best signal quality as the target carrier frequency based on signal quality of the carrier frequencies, or the terminal device may randomly select a carrier frequency as the target carrier frequency, to select a to-be-camped cell on the target carrier frequency.

If the cell reselection information further includes priority information corresponding to each carrier frequency, when performing cell reselection, the terminal device selects, based on the identifier of the network slice supported by each carrier frequency, and a priority of each carrier frequency, a carrier frequency that can support the network slice supported by the terminal device and that has a highest priority as the target carrier frequency, to select a to-be-camped cell on the target carrier frequency.

For example, in Table 5, a carrier frequency having a highest priority is F1. In this case, the terminal device selects the carrier frequency F1 as the target carrier frequency, to select a to-be-camped cell on the carrier frequency F1.

In an optional implementation, when a plurality of carrier frequencies can support the network slice supported by the terminal device, the terminal device may further select a carrier frequency with a highest priority as the target carrier frequency based on a priority of each carrier frequency, to select a to-be-camped cell on the target carrier frequency.

If the cell reselection information further includes priority information corresponding to each network slice, when performing cell reselection, the terminal device selects, based on the identifier of the network slice supported by each carrier frequency, and a priority of each network slice, a carrier frequency that can support the network slice supported by the terminal device and that can support a network slice having a highest priority as the target carrier frequency, to select a to-be-camped cell on the target carrier frequency.

For example, in Table 6, a network slice having a highest priority is the network slice 1. In this case, the terminal device selects the carrier frequency F1 that can support the network slice 1 as the target carrier frequency. Alternatively, the terminal device selects the carrier frequency F2 that can support the network slice 1 as the target carrier frequency, to select a to-be-camped cell on the carrier frequency F2.

In an optional implementation, when a plurality of carrier frequencies can support the network slice supported by the terminal device, the terminal device may further select, based on a priority of each network slice, a carrier frequency that can support a network slice having a highest priority as the target carrier frequency, to select a to-be-camped cell on the target carrier frequency.

During implementation of this embodiment of the present invention, the radio access network device sends the cell reselection information to the terminal device by using the RRC message. When the terminal device enters the idle state or the inactive state and needs to perform cell reselection, the terminal device reselects, based on the cell reselection information, the cell on the carrier frequency that can support the network slice supported by the terminal device. Therefore, cases in which the terminal device performs ineffective cell reselection are reduced, signaling overheads are reduced, and cell reselection efficiency is improved.

To facilitate better implementation of the cell reselection method in the embodiments of the present invention, the present invention further provides a related device for implementing the method.

Figure 4:
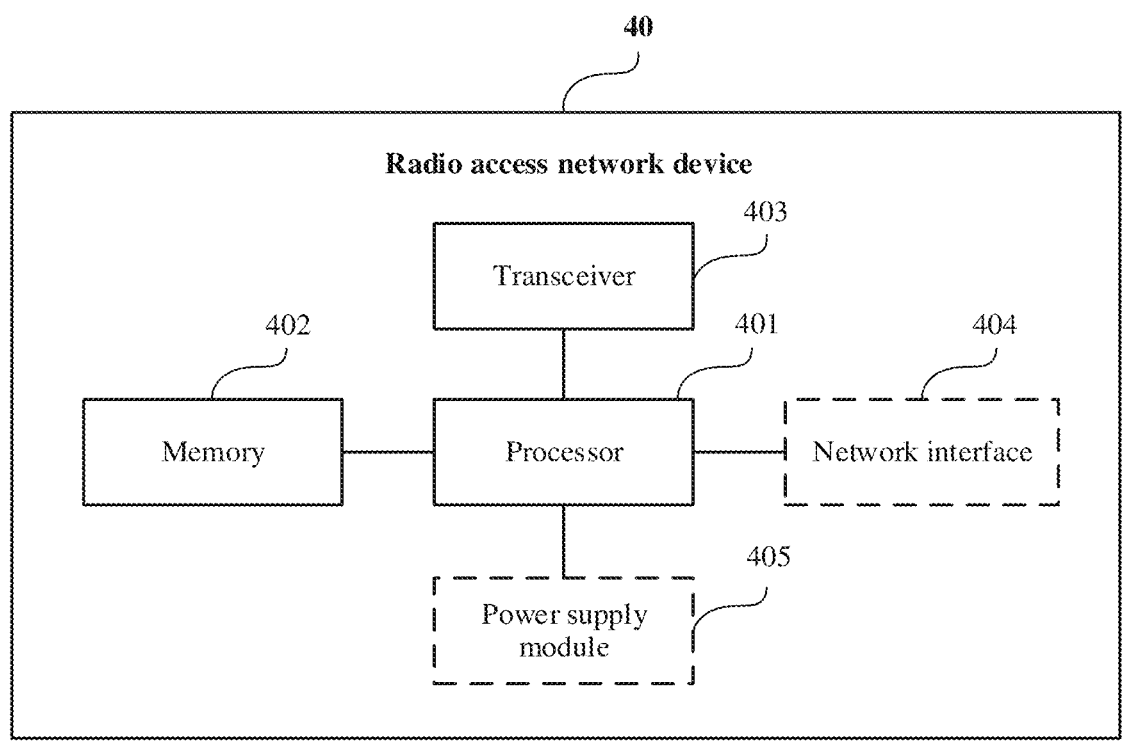
FIG. 4 is a schematic structural diagram of a radio access network device according to an embodiment of the present invention.

FIG. 4 is a schematic structural diagram of a radio access network device 40 according to an embodiment of the present invention. As shown in FIG. 4, the radio access network device 40 includes a processor 401, a memory 402, and a transceiver 403. The processor 401, the memory 402, and the transceiver 403 may be connected by using a bus or in another manner.

In some possible implementations, the radio access network device 40 may further include a network interface 404 and a power supply module 405.

The processor 401 may be a general-purpose processor, for example, a central processing unit (CPU), or may be a digital signal processor (DSP) an application-specific integrated circuit (ASIC), or one or more integrated circuits configured to implement this embodiment of the present invention. The processor 401 can process data received by the transceiver 403. The processor 401 may also process data that is to be sent to the transceiver 403 for transmission over an antenna.

The memory 402 is configured to store an instruction and transmit the instruction to the CPU. The memory 402 may include a volatile memory, for example, a random access memory (RAM). The memory 402 may also include a nonvolatile memory such as a read-only memory (ROM), a flash memory, a hard disk drive (HDD), or a solid-state drive (SSD). The memory 402 may also include a combination of the foregoing types of memories. The memory 402 is connected to the processor 401 by using the bus. In this embodiment of the present invention, in the foregoing first application scenario, the memory 402 is further configured to store an identifier of a neighboring carrier frequency of the radio access network device 40, and SSTs separately supported by a serving carrier frequency of the radio access network device 40 and the neighboring carrier frequency. Alternatively, the memory is further configured to store the identifier of the neighboring carrier frequency of the radio access network device 40, and network slice set identifiers separately corresponding to the serving carrier frequency of the radio access network device 40 and the neighboring carrier frequency. In the foregoing second application scenario, the memory 402 is further configured to store SNSSAI supported by a terminal device, the identifier of the neighboring carrier frequency of the radio access network device 40, and SNSSAI supported by the neighboring carrier frequency of the radio access network device 40. Alternatively, the memory 402 is further configured to store an SST supported by the terminal device, the identifier of the neighboring carrier frequency of the radio access network device 40, and an SST supported by the neighboring carrier frequency of the radio access network device 40.

The transceiver 403 is configured to perform transmitting processing (such as modulation) on a mobile communications signal generated by the processor 401, and is further configured to perform receiving processing (such as demodulation) on a mobile communications signal received by an antenna.

The network interface 404 is configured to perform data communication between the radio access network device 40 and another device. The network interface 404 may be a wired interface or a wireless interface.

The power supply module 405 is configured to supply power to modules of the radio access network device 40.

In this embodiment of the present invention, the processor 401 is configured to invoke a program and data that are stored in the memory 402, to perform the following operations:

The processor 401 generates cell reselection information, where the cell reselection information includes an identifier of at least one carrier frequency and an identifier of a network slice supported by each of the at least one carrier frequency.

The transceiver 403 sends the cell reselection information to the terminal device, where the cell reselection information is used by the terminal device to perform cell reselection.

Optionally, the sending, by the transceiver 403, the cell reselection information to the terminal device includes:

broadcasting, by the transceiver 403, the cell reselection information to the terminal device; or adding, by the transceiver 403, the cell reselection information to an RRC message, and sending the cell reselection information to the terminal device.

Optionally, the cell reselection information further includes priority information corresponding to each carrier frequency.

Optionally, the cell reselection information further includes priority information corresponding to each of network slices supported by the terminal device.

Optionally, if the transceiver 403 adds the cell reselection information to the RRC message and sends the cell reselection information to the terminal device, the network slice supported by each carrier frequency includes some or all of network slices supported by the terminal device.

Optionally, the RRC message includes an RRC connection release message or an RRC connection reject message.

Optionally, if the transceiver 403 adds the cell reselection information to the RRC connection release message or the RRC connection reject message and sends the cell reselection information to the terminal device, the cell reselection information further includes an identifier of a first network slice that causes an RRC connection of the terminal device to be released or rejected.

Optionally, the identifier of the network slice is SNSSAI corresponding to the network slice, an SST corresponding to the network slice, or a network slice set identifier corresponding to the network slice, where one piece of SNSSAI corresponds to one network slice, one SST corresponds to one or more network slices, and one network slice set identifier corresponds to one or more network slices.

Optionally, before the processor 401 generates the cell reselection information, the transceiver 403 further receives a first request sent by the terminal device, where the first request is used to request the radio access network device to send the cell reselection information. The generating, by the processor 401, the cell reselection information is specifically: generating the cell reselection information based on the first request. The sending, by the transceiver 403, the cell reselection information to the terminal device is specifically: adding the cell reselection information to a random access response message (for example, a msg2 or a msg4 in an LTE or 5G system), and broadcasting the cell reselection information to the terminal device; or broadcasting the cell reselection information to the terminal device by using a broadcast channel.

It should be noted that for functions of the function modules of the radio access network device 40 described in this embodiment of the present invention, refer to the related descriptions of the corresponding radio access network device in the embodiment shown in FIG. 4. Details are not described herein again.

Figure 5:
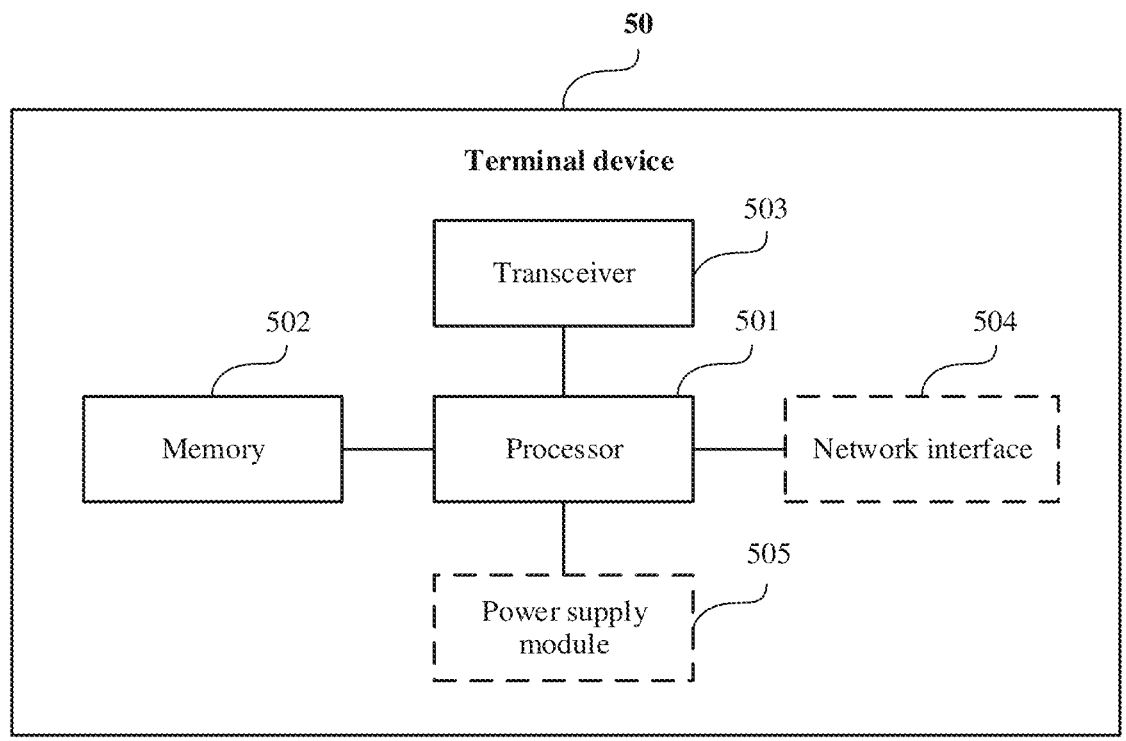
FIG. 5 is a schematic structural diagram of a terminal device according to an embodiment of the present invention.

FIG. 5 is a schematic structural diagram of a terminal device according to an embodiment of the present invention. As shown in FIG. 5, the terminal device 50 may include a processor 501, a memory 502, and a transceiver 503. The processor 501, the memory 502, and the transceiver 503 may be connected by using a bus or in another manner.

In some possible implementations, the radio access network device 50 may further include a network interface 504 and a power supply module 505.

The processor 501 may be a general-purpose processor, for example, a CPU, or may be a DSP, an ASIC, or one or more integrated circuits configured to implement this embodiment of the present invention. The processor 501 can process data received by the transceiver 503. The processor 501 may also process data that is to be sent to the transceiver 503 for transmission over an antenna.

The memory 502 is configured to store an instruction and transmit the instruction to the CPU. The memory 502 may include a volatile memory, for example, a RAM. The memory 502 may also include a nonvolatile memory such as a ROM, a flash memory, an HDD, or an SSD. The memory 502 may also include a combination of the foregoing types of memories. The memory 502 is connected to the processor 501 by using the bus. In this embodiment of the present invention, in the foregoing first application scenario, the memory 502 is further configured to store an SST of a network slice supported by the terminal device 50. Alternatively, the memory 502 is further configured to store a network slice set identifier corresponding to the network slice supported by the terminal device 50. In the foregoing second application scenario, the memory 502 is further configured to store SNSSAI supported by the terminal device 50.

The transceiver 503 is configured to perform transmitting processing (such as modulation) on a mobile communications signal generated by the processor 501, and is further configured to perform receiving processing (such as demodulation) on a mobile communications signal received by an antenna.

The network interface 504 is configured to perform data communication between the radio access network device 50 and another device. The network interface 504 may be a wired interface or a wireless interface.

The power supply module 505 is configured to supply power to modules of the radio access network device 50.

In this embodiment of the present invention, the processor 501 is configured to invoke a program and data that are stored in the memory 502, to perform the following operations:

The processor 501 receives, by using the transceiver 503, cell reselection information sent by a radio access network device, where the cell reselection information includes an identifier of at least one carrier frequency and an identifier of a network slice supported by each of the at least one carrier frequency.

When the terminal device 50 performs cell reselection, the processor 501 selects, based on the identifier of the network slice supported by each carrier frequency, a cell on a carrier frequency that supports a network slice supported by the terminal device as a reselected to-be-camped cell.

Optionally, the receiving, by the transceiver 503, cell reselection information sent by a radio access network device includes:

receiving the cell reselection information broadcasted by the radio access network device; or receiving the cell reselection information sent by the radio access network device by using an RRC message.

Optionally, the cell reselection information further includes priority information corresponding to each carrier frequency. The selecting, by the processor 501 based on the identifier of the network slice supported by each carrier frequency, a cell on a carrier frequency that supports a network slice supported by the terminal device as a reselected to-be-camped cell includes:

selecting, based on the identifier of the network slice supported by each carrier frequency and the priority information corresponding to each carrier frequency, a cell on a carrier frequency that supports the network slice supported by the terminal device and that has a highest priority as the reselected to-be-camped cell.

Optionally, the cell reselection information further includes priority information corresponding to each of network slices supported by the terminal device. The selecting, by the processor 501 based on the identifier of the network slice supported by each carrier frequency, a cell on a carrier frequency that supports a network slice supported by the terminal device as a reselected to-be-camped cell includes:

selecting, based on the identifier of the network slice supported by each carrier frequency and the priority information corresponding to each network slice, a cell on a carrier frequency that supports a highest-priority network slice of the network slices supported by the terminal device as the reselected to-be-camped cell.

Optionally, if the transceiver 503 receives the cell reselection information sent by the radio access network device by using an RRC message, the network slice supported by each carrier frequency includes some or all of network slices supported by the terminal device.

Optionally, the RRC message includes an RRC connection release message or an RRC connection reject message.

Optionally, if the transceiver 503 receives the cell reselection information sent by the radio access network device by using the RRC connection release message or the RRC connection reject message, the cell reselection information further includes an identifier of a first network slice that causes an RRC connection of the terminal device to be released or rejected. The reselecting, by the processor 501 based on the identifier of the network slice supported by each carrier frequency, a carrier frequency that supports a network slice supported by the terminal device as a target carrier frequency includes: reselecting, based on the identifier of the network slice supported by each carrier frequency and the identifier of the first network slice, a carrier frequency that supports another network slice other than the first network slice as the target carrier frequency.

Optionally, the identifier of the network slice is SNSSAI corresponding to the network slice, an SST corresponding to the network slice, or a network slice set identifier corresponding to the network slice, where one piece of SNSSAI corresponds to one network slice, one SST corresponds to one or more network slices, and one network slice set identifier corresponds to one or more network slices.

Optionally, before receiving the cell reselection information sent by the radio access network device, the transceiver 503 further sends a first request to the radio access network device, where the first request is used to request the radio access network device to send the cell reselection information. The receiving, by the transceiver 503, cell reselection information sent by a radio access network device is specifically: receiving the cell reselection information broadcasted by the radio access network device by using a random access response message (for example, a msg2 or a msg4 in an LTE or 5G system); or receiving the cell reselection information broadcasted by the radio access network device through a broadcast channel.

It should be noted that, for functions of the function modules of the terminal device 50 described in this embodiment of the present invention, refer to the related descriptions of the corresponding terminal device in the embodiment shown in FIG. 3. Details are not described herein again.

Figure 6:
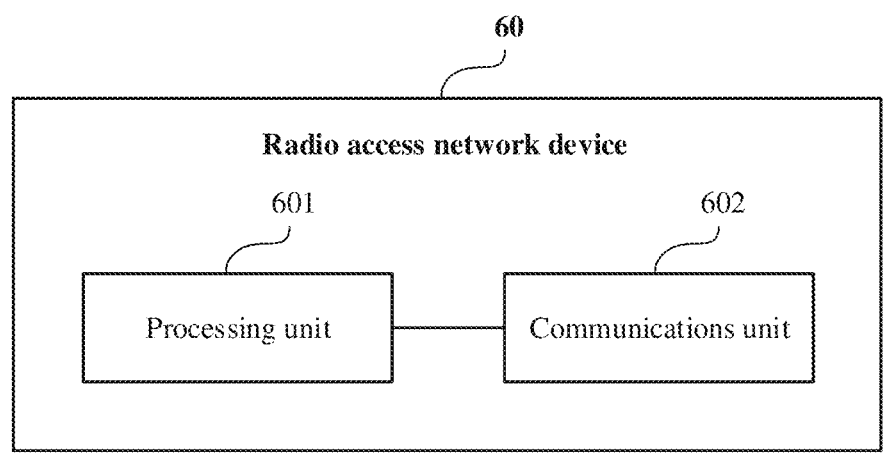
FIG. 6 is a schematic structural diagram of another radio access network device according to an embodiment of the present invention.

FIG. 6 is a schematic structural diagram of another radio access network device according to an embodiment of the present invention. As shown in FIG. 6, a radio access network device 60 includes a processing unit 601 and a communications unit 602.

In this embodiment of the present invention, the processing unit 601 is configured to generate cell reselection information, where the cell reselection information includes an identifier of at least one carrier frequency and an identifier of a network slice supported by each of the at least one carrier frequency.

The communications unit 602 is configured to send the cell reselection information to a terminal device, where the cell reselection information is used by the terminal device to perform cell reselection.

In this embodiment, the radio access network device 60 is presented in a form of a functional unit. The "unit" herein may be an ASIC, a processor executing one or more software or firmware programs, a memory, an integrated logical circuit, and/or another device that can provide the foregoing functions. The radio access network device may be in the form shown in FIG. 4. The processing unit 601 may be implemented by using the processor 401 in FIG. 4, and the communications unit 602 may be implemented by using the transceiver 403 in FIG. 4.

In this embodiment of the present invention, the radio access network device 60 further includes a storage unit. In the foregoing first application scenario, the storage unit is configured to store an identifier of a neighboring carrier frequency of the radio access network device 60, and SSTs separately supported by a serving carrier frequency of the radio access network device 60 and the neighboring carrier frequency. Alternatively, the storage unit is configured to store the identifier of the neighboring carrier frequency of the radio access network device 60, and network slice set identifiers separately corresponding to the serving carrier frequency of the radio access network device 60 and the neighboring carrier frequency. In the foregoing second application scenario, the storage unit is configured to store SNSSAI supported by a terminal device, the identifier of the neighboring carrier frequency of the radio access network device 60, and SNSSAI supported by the neighboring carrier frequency of the radio access network device 60. Alternatively, the storage unit is configured to store an SST supported by the terminal device, the identifier of the neighboring carrier frequency of the radio access network device 60, and an SST supported by the neighboring carrier frequency of the radio access network device 60.

Optionally, the communications unit 602 being configured to send the cell reselection information to a terminal device includes:

broadcasting the cell reselection information to the terminal device; or adding the cell reselection information to an RRC message, and sending the cell reselection information to the terminal device.

Optionally, the cell reselection information further includes priority information corresponding to each carrier frequency.

Optionally, the cell reselection information further includes priority information corresponding to each of network slices supported by the terminal device.

Optionally, if the communications unit 602 adds the cell reselection information to the RRC message and sends the cell reselection information to the terminal device, the network slice supported by each carrier frequency includes some or all of network slices supported by the terminal device.

Optionally, the RRC message includes an RRC connection release message or an RRC connection reject message.

Optionally, if the communications unit 602 adds the cell reselection information to the RRC connection release message or the RRC connection reject message and sends the cell reselection information to the terminal device, the cell reselection information further includes an identifier of a first network slice that causes an RRC connection of the terminal device to be released or rejected.

Optionally, the identifier of the network slice is SNSSAI corresponding to the network slice, an SST corresponding to the network slice, or a network slice set identifier corresponding to the network slice, where one piece of SNSSAI corresponds to one network slice, one SST corresponds to one or more network slices, and one network slice set identifier corresponds to one or more network slices.

Optionally, before the processing unit 601 generates the cell reselection information, the communications unit 602 further receives a first request sent by the terminal device, where the first request is used to request the radio access network device to send the cell reselection information. The generating, by the processing unit 601, the cell reselection information is specifically: generating the cell reselection information based on the first request. The sending, by the communications unit 602, the cell reselection information to the terminal device is specifically: adding the cell reselection information to a random access response message (for example, a msg2 or a msg4 in an LTE or 5G system), and broadcasting the cell reselection information to the terminal device; or broadcasting the cell reselection information to the terminal device through a broadcast channel.

It should be noted that for functions of the function modules of the radio access network device 60 described in this embodiment of the present invention, refer to the related descriptions of the corresponding radio access network device in the embodiment shown in FIG. 6. Details are not described herein again.

Figure 7:
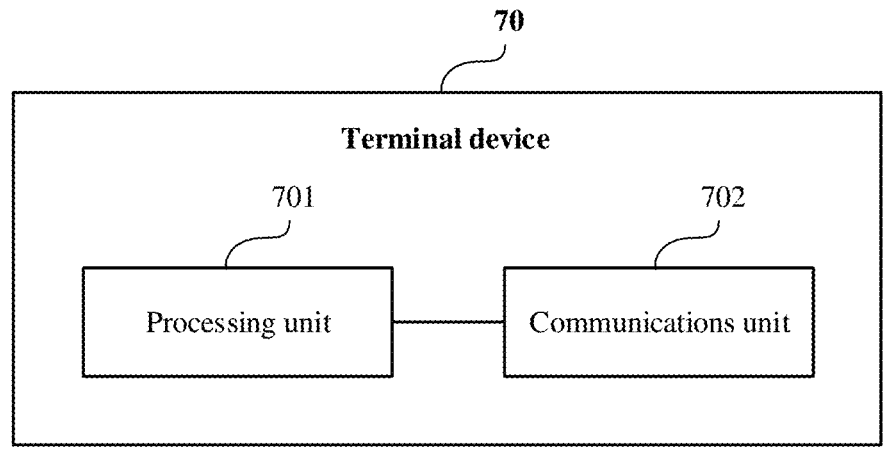
FIG. 7 is a schematic structural diagram of another terminal device according to an embodiment of the present invention.

FIG. 7 is a schematic structural diagram of another terminal device according to an embodiment of the present invention. As shown in FIG. 7, a terminal device 70 includes a processing unit 701 and a communications unit 702.

In this embodiment of the present invention, the communications unit 702 is configured to receive cell reselection information sent by a radio access network device, where the cell reselection information includes an identifier of at least one carrier frequency and an identifier of a network slice supported by each of the at least one carrier frequency.

The processing unit 701 is configured to: when the terminal device performs cell reselection, select, based on the identifier of the network slice supported by each carrier frequency, a cell on a carrier frequency that supports a network slice supported by the terminal device as a reselected to-be-camped cell.

In this embodiment, the terminal device 70 is presented in a form of a functional unit. The "unit" herein may be an ASIC, a processor executing one or more software or firmware programs, a memory, an integrated logical circuit, and/or another device that can provide the foregoing functions. The radio access network device may be in the form shown in FIG. 5. The processing unit 701 may be implemented by using the processor 501 in FIG. 5, and the communications unit 702 may be implemented by using the transceiver 503 in FIG. 5.

Optionally, the receiving, by the communications unit 702, cell reselection information sent by a radio access network device includes:

receiving the cell reselection information broadcasted by the radio access network device; or receiving the cell reselection information sent by the radio access network device by using an RRC message.

Optionally, the cell reselection information further includes priority information corresponding to each carrier frequency. The selecting, by the processing unit 701 based on the identifier of the network slice supported by each carrier frequency, a cell on a carrier frequency that supports a network slice supported by the terminal device as a reselected to-be-camped cell includes:

selecting, based on the identifier of the network slice supported by each carrier frequency and the priority information corresponding to each carrier frequency, a cell on a carrier frequency that supports the network slice supported by the terminal device and that has a highest priority as the reselected to-be-camped cell.

Optionally, the cell reselection information further includes priority information corresponding to each of network slices supported by the terminal device. The selecting, by the processing unit 701 based on the identifier of the network slice supported by each carrier frequency, a cell on a carrier frequency that supports a network slice supported by the terminal device as a reselected to-be-camped cell includes:

selecting, based on the identifier of the network slice supported by each carrier frequency and the priority information corresponding to each network slice, a cell on a carrier frequency that supports a highest-priority network slice of the network slices supported by the terminal device as the reselected to-be-camped cell.

Optionally, if the communications unit 702 receives the cell reselection information sent by the radio access network device by using an RRC message, the network slice supported by each carrier frequency includes some or all of network slices supported by the terminal device.

Optionally, the RRC message includes an RRC connection release message or an RRC connection reject message.

Optionally, if the communications unit 702 receives the cell reselection information sent by the radio access network device by using the RRC connection release message or the RRC connection reject message, the cell reselection information further includes an identifier of a first network slice that causes an RRC connection of the terminal device to be released or rejected. The selecting, by the processing unit 701 based on the identifier of the network slice supported by each carrier frequency, a cell on a carrier frequency that supports a network slice supported by the terminal device as a reselected to-be-camped cell includes: selecting, based on the identifier of the network slice supported by each carrier frequency and the identifier of the first network slice, a cell on a carrier frequency that supports another network slice other than the first network slice as the reselected to-be-camped cell.

Optionally, the identifier of the network slice is SNSSAI corresponding to the network slice, an SST corresponding to the network slice, or a network slice set identifier corresponding to the network slice, where one piece of SNSSAI corresponds to one network slice, one SST corresponds to one or more network slices, and one network slice set identifier corresponds to one or more network slices.

Optionally, before receiving the cell reselection information sent by the radio access network device, the communications unit 702 further sends a first request to the radio access network device, where the first request is used to request the radio access network device to send the cell reselection information. The receiving, by the communications unit 702, the cell reselection information sent by the radio access network device is specifically: receiving the cell reselection information broadcasted by the radio access network device by using a random access response message (for example, a msg2 or a msg4 in an LTE or 5G system); or receiving the cell reselection information broadcasted by the radio access network device by using a broadcast channel.

It should be noted that, for functions of the function modules of the terminal device 70 described in this embodiment of the present invention, refer to the related descriptions of the corresponding terminal device in the embodiment shown in FIG. 3. Details are not described herein again.

Figure 8:
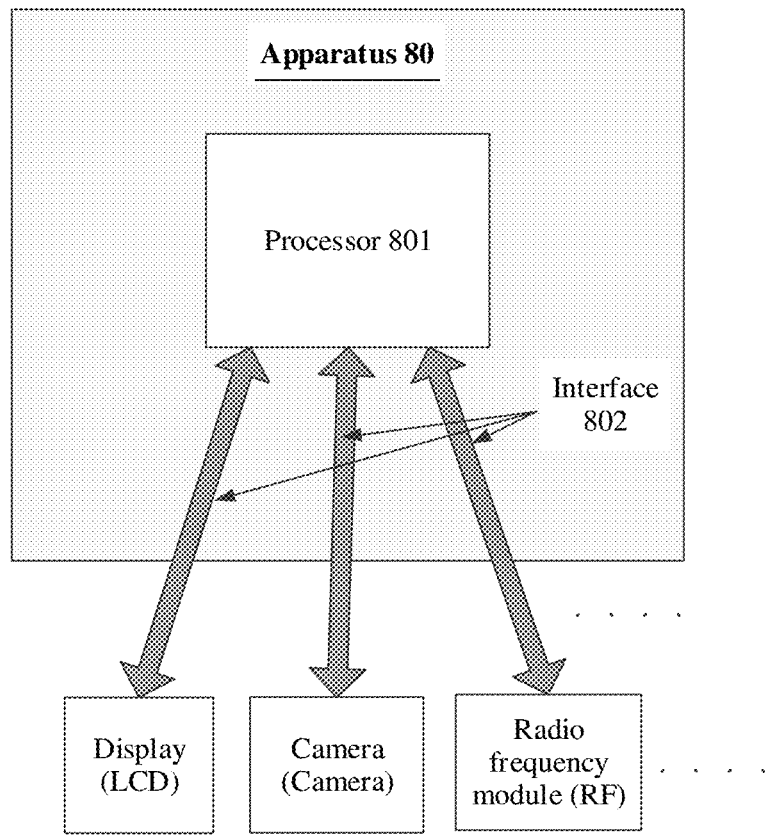
FIG. 8 is a schematic structural diagram of an apparatus according to an embodiment of the present invention.

FIG. 8 is a schematic structural diagram of an apparatus according to an embodiment of the present invention. As shown in FIG. 8, the apparatus 80 may include a processor 801, and one or more interfaces 802 coupled to the processor 801.

The processor 801 may be configured to read and execute a computer-readable instruction. In a specific implementation, the processor 801 may mainly include a controller, an arithmetic unit, and a register. The controller is mainly responsible for decoding an instruction and sending a control signal for an operation corresponding to the instruction. The arithmetic unit is mainly responsible for performing a fixed-point or floating-point arithmetic operation, a shift operation, a logic operation, and the like, or may perform an address operation and address translation. The register is mainly responsible for storing a register operand, an intermediate operation result, and the like that are temporarily stored in an instruction execution process. In a specific implementation, a hardware architecture of the processor 801 may be an application-specific integrated circuit (ASIC) architecture, or the like. The processor 801 may have a single core or a plurality of cores.

The interface 802 may be configured to input to-be-processed data to the processor 801, and may output a processing result of the processor 801. In a specific implementation, the interface 802 may be connected to a plurality of peripheral devices (for example, a display (LCD), a camera, and a radio frequency module). The interface 802 may further include a plurality of independent interfaces, for example, an Ethernet interface, an LCD interface, and a camera interface, which are separately responsible for communication between different peripheral devices and the processor 801.

In this application, the processor 801 may be configured to: invoke, from a memory, an implementation program of the cell reselection method on a radio access network device side provided in one or more embodiments of this application, and execute an instruction included in the program. The interface 802 may be configured to output an execution result of the processor 801. For the cell reselection method provided in one or more embodiments of this application, refer to the foregoing embodiments. Details are not described herein again.

It should be noted that a function corresponding to each of the processor 801 and the interface 802 may be implemented by using a hardware design, or may be implemented by using a software design, or may be implemented by combining software and hardware. This is not limited herein.

Figure 9:
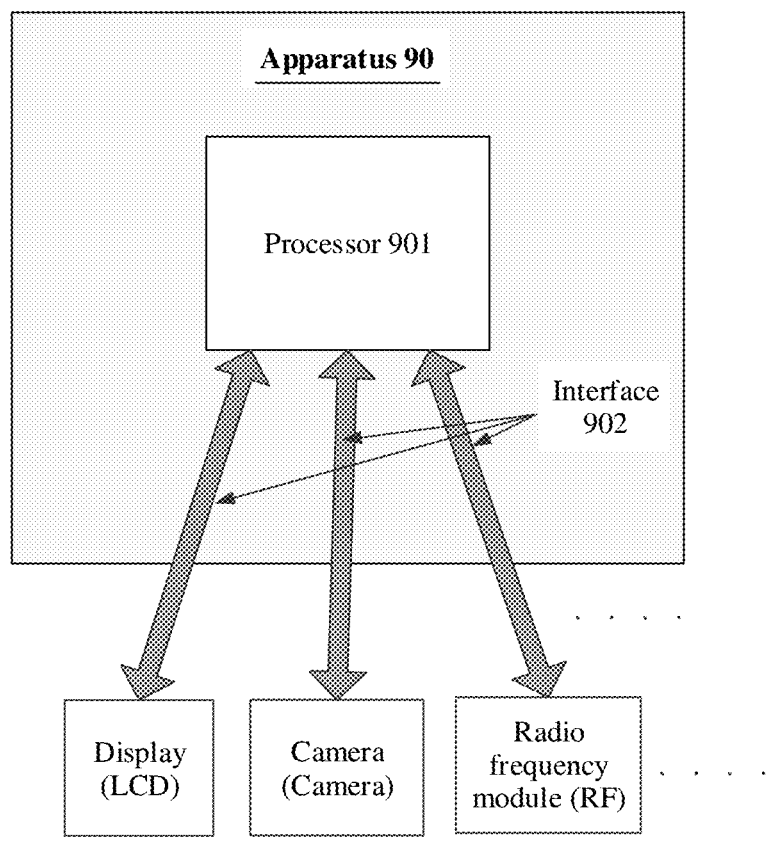
FIG. 9 is a schematic structural diagram of another apparatus according to an embodiment of the present invention.

FIG. 9 is a schematic structural diagram of an apparatus according to an embodiment of the present invention. As shown in FIG. 9, the apparatus 90 may include a processor 901, and one or more interfaces 902 coupled to the processor 901.

The processor 901 may be configured to read and execute a computer-readable instruction. In a specific implementation, the processor 901 may mainly include a controller, an arithmetic unit, and a register. The controller is mainly responsible for decoding an instruction and sending a control signal for an operation corresponding to the instruction. The arithmetic unit is mainly responsible for performing a fixed-point or floating-point arithmetic operation, a shift operation, a logic operation, and the like, or may perform an address operation and address translation. The register is mainly responsible for storing a register operand, an intermediate operation result, and the like that are temporarily stored in an instruction execution process. In a specific implementation, a hardware architecture of the processor 901 may be an application-specific integrated circuit (ASIC) architecture, or the like. The processor 901 may have a single core or a plurality of cores.

The interface 902 may be configured to input to-be-processed data to the processor 901, and may output a processing result of the processor 901. In a specific implementation, the interface 902 may be connected to a plurality of peripheral devices (for example, a display (LCD), a camera, and a radio frequency module). The interface 902 may further include a plurality of independent interfaces, for example, an Ethernet interface, an LCD interface, and a camera interface, which are separately responsible for communication between different peripheral devices and the processor 901.

In this application, the processor 901 may be configured to: invoke, from a memory, an implementation program of the cell reselection method on a terminal device side provided in one or more embodiments of this application, and execute an instruction included in the program. The interface 902 may be configured to output an execution result of the processor 901. For the cell reselection method provided in one or more embodiments of this application, refer to the foregoing embodiments. Details are not described herein again.

It should be noted that a function corresponding to each of the processor 901 and the interface 902 may be implemented by using a hardware design, or may be implemented by using a software design, or may be implemented by combining software and hardware. This is not limited herein.

Methods or algorithm steps described in combination with the content disclosed in this embodiment of the present invention may be implemented by hardware, or may be implemented by a processor by executing a software instruction. The software instruction may include a corresponding software module. The software module may be stored in a RAM, a flash memory, a ROM, an erasable programmable read only memory (EPROM), an electrically erasable programmable read only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a transceiver or a relay device. Certainly, the processor and the storage medium may exist in the radio access network device or the terminal device as discrete assemblies.

A person skilled in the art should be aware that in the foregoing one or more examples, functions described in the embodiments of the present invention may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or special-purpose computer.

In the foregoing specific implementations, the objectives, technical solutions, and beneficial effects of the embodiments of the present invention are further described in detail. It should be understood that the foregoing descriptions are merely specific implementations of the embodiments of the present invention, but are not intended to limit the protection scope of the embodiments of present invention. Any modification, equivalent replacement, or improvement made based on technical solutions of the embodiments of the present invention shall fall within the protection scope of the embodiments of the present invention.

What is claimed is:

1. A cell reselection method, comprising:
generating, by a radio access network device, cell reselection information, wherein the cell reselection information comprises an identifier of at least one carrier frequency, an identifier of a network slice supported by each of the at least one carrier frequency, and priority information corresponding to each carrier frequency, wherein the identifier of the network slice is a network slice set identifier, wherein the network slice set identifier is obtained by grouping a plurality of network slices into different network slice sets by an Access and Mobility Management Function (AMF); and
sending, by the radio access network device, the cell reselection information to a terminal device, wherein the cell reselection information is used by the terminal device for cell reselection.

2. The method according to claim 1, wherein the sending, by the radio access network device, the cell reselection information to the terminal device comprises:
broadcasting, by the radio access network device, the cell reselection information to the terminal device; or adding, by the radio access network device, the cell reselection information to a radio resource control (RRC) message, and sending the cell reselection information to the terminal device.

3. The method according to claim 2, wherein the RRC message comprises an RRC connection release message or an RRC connection reject message.

4. The method according to claim 1, wherein the cell reselection information further comprises priority information corresponding to each of network slice sets or each of network slice.

5. The method according to claim 1, further comprising:
receiving, by the radio access network device from a terminal device, a first request, the first request instructs the radio access network device to send the cell reselection information to the terminal device.

6. A cell reselection method, comprising:
receiving, by a terminal device, cell reselection information from a radio access network device, wherein the cell reselection information comprises an identifier of at least one carrier frequency, an identifier of a network slice supported by each of the at least one carrier frequency, and priority information corresponding to each carrier frequency, wherein the identifier of the network slice is a network slice set identifier, wherein the network slice set identifier is obtained by grouping a plurality of network slices into different network slice sets by an Access and Mobility Management Function (AMF); and
selecting, by the terminal device based on the identifier of the network slice supported by each of the at least one carrier frequency, a cell on a carrier frequency configured to support a network slice supported by the terminal device as a reselected to-be-camped cell.

7. The method according to claim 6, wherein the receiving, by the terminal device, the cell reselection information from the radio access network device comprises:
receiving, by the terminal device, the cell reselection information broadcasted by the radio access network device; or receiving, by the terminal device, the cell reselection information from the radio access network device by a radio resource control (RRC) message.

8. The method according to claim 7, wherein the RRC message comprises an RRC connection release message or an RRC connection reject message.

9. The method according to claim 6, wherein
the cell reselection information further comprises at least priority information corresponding to each network slice or each network slice set; and
the selecting, by the terminal device based on the identifier of the network slice supported by each of the at least one carrier frequency, the cell on the carrier frequency configured to support the network slice supported by the terminal device as the reselected to-be-camped cell comprises at least
selecting, by the terminal device based on the identifier of the network slice supported by each of the at least one carrier frequency and the priority information corresponding to each network slice supported by the terminal device, the cell on the carrier frequency configured to support a highest-priority network slice of each network slice or network slice set supported by the terminal device as the reselected to-be-camped cell.

10. The method according to claim 6,
wherein the identifier of the network slice is single network slice selection assistance information (SNSSAI) corresponding to the network slice, slice service type (SST) information corresponding to the network slice, and a network slice set identifier corresponding to the network slice,
wherein one piece of SNSSAI corresponds to one network slice, one SST corresponds to one or more network slices, and one network slice set identifier corresponds to one or more network slices.

11. The method according to claim 6, the method further comprises:
the selecting, by the terminal device based on the identifier of the network slice supported by each of the at least one carrier frequency, the cell on the carrier frequency configured to support the network slice supported by the terminal device as the reselected to-be-camped cell comprises at least:
selecting, by the terminal device based on the identifier of the network slice supported by each of the at least one carrier frequency and the priority information corresponding to each carrier frequency, the cell on the carrier frequency configured to support the network slice supported by the terminal device and having a highest priority as the reselected to-be-camped cell.

12. A radio access network device, comprising:
a processor, and
a transceiver, wherein
the processor is configured to generate cell reselection information, wherein the cell reselection information comprises an identifier of at least one carrier frequency, an identifier of a network slice supported by each of the at least one carrier frequency, and priority information corresponding to each carrier frequency, the identifier of the at least one carrier frequency includes a carrier frequency identification that corresponds to a combination of a data string and an integer, the data string including at least one letter, and the integer including at least one number, wherein the identifier of the network slice is a network slice set identifier, wherein the network slice set identifier is obtained by grouping a plurality of network slices into different network slice sets by an Access and Mobility Management Function (AMF); and
the transceiver is configured to send the cell reselection information to a terminal device, wherein the cell reselection information is useable by the terminal device for cell reselection.

13. The radio access network device according to claim 12, wherein the cell reselection information further comprises at least
priority information corresponding to each network slice supported by the terminal device.

14. A terminal device, comprising:
a processor and
a transceiver, wherein
the transceiver is configured to receive cell reselection information from a radio access network device, wherein the cell reselection information comprises an identifier of at least one carrier frequency, an identifier of a network slice supported by each of the at least one carrier frequency, and priority information corresponding to each carrier frequency, wherein the identifier of the network slice is a network slice set identifier, wherein the network slice set identifier is obtained by grouping a plurality of network slices into different network slice sets by an Access and Mobility Management Function (AMF); and
the processor is configured to select, based on the identifier of the network slice supported by each of the at least one carrier frequency, a cell on a carrier frequency configured to support a network slice supported by the terminal device as a reselected to-be-camped cell.

15. The terminal device according to claim 14, wherein the cell reselection information further comprises at least
priority information corresponding to each network slice supported by the terminal device.

16. A non-transitory computer-readable storage medium, comprising computer-readable instructions stored thereon that, when executed by a radio access network device having a processor, cause the radio access network device to:
generate cell reselection information, wherein the cell reselection information comprises an identifier of at least one carrier frequency, an identifier of a network slice supported by each of the at least one carrier frequency and priority information corresponding to each carrier frequency, wherein the identifier of the network slice is a network slice set identifier, wherein the network slice set identifier is obtained by grouping a plurality of network slices into different network slice sets by an Access and Mobility Management Function (AMF);
send the cell reselection information to a terminal device, wherein the cell reselection information is useable by the terminal device for cell reselection.

17. A non-transitory computer-readable storage medium, comprising computer-readable instructions stored thereon that, executed by a terminal device having a processor, cause the terminal device to:
receive cell reselection information from a radio access network device, wherein the cell reselection information comprises an identifier of at least one carrier frequency, an identifier of a network slice supported by each of the at least one carrier frequency and priority information corresponding to each carrier frequency, wherein the identifier of the network slice is a network slice set identifier, wherein the network slice set identifier is obtained by grouping a plurality of network slices into different network slice sets by an Access and Mobility Management Function (AMF); and
select, based on the identifier of the network slice supported by each of the at least one carrier frequency, a cell on a carrier frequency configured to support a network slice supported by the terminal device as a reselected to-be-camped cell.

* * * * *